US012011714B2

(12) United States Patent
Frisan et al.

(10) Patent No.: US 12,011,714 B2
(45) Date of Patent: Jun. 18, 2024

(54) MICROFLUIDIC PROBE HEAD WITH BARRIER PROJECTIONS

(71) Applicants: Bio-Rad Laboratories, Inc., Hercules, CA (US); Bio-Rad Europe GmbH, Basel (CH)

(72) Inventors: Emilie Frisan, Saint Ouen (FR); Laurent Guillon, Saint-Denis (FR); Robert Lovchik, Schönenberg (CH); David P. Taylor, Thalwil (CH); Claudia I. Trainito, Horgen (CH); Govind V. Kaigala, Pfäffikon (CH)

(73) Assignees: Bio-Rad Laboratories, Inc., Hercules, CA (US); Bio-Rad Europe Gmbh, Basel (CH)

( * ) Notice: Subject to any disclaimer, the term of this patent is extended or adjusted under 35 U.S.C. 154(b) by 251 days.

(21) Appl. No.: 16/984,955

(22) Filed: Aug. 4, 2020

(65) Prior Publication Data

US 2020/0360925 A1 Nov. 19, 2020

Related U.S. Application Data

(63) Continuation of application No. PCT/EP2019/052743, filed on Feb. 5, 2019.

(Continued)

(51) Int. Cl.
*B01L 3/00* (2006.01)
*B01L 3/02* (2006.01)

(52) U.S. Cl.
CPC ....... *B01L 3/502707* (2013.01); *B01L 3/0293* (2013.01); *B01L 3/502761* (2013.01);

(Continued)

(58) Field of Classification Search
CPC ....... B01L 3/502761; B01L 2400/0487; B01L 2200/0647; B01L 2200/027; B01L 2300/0832; B01L 2200/141
See application file for complete search history.

(56) References Cited

U.S. PATENT DOCUMENTS 8,276,760 B2 * 10/2012 Lean .................... B01D 21/265 209/208
8,546,084 B2 10/2013 Chaibi (Continued)

FOREIGN PATENT DOCUMENTS

CN 104321271 A 1/2015
KR 20170143310 A * 12/2017 ........ B01L 3/502761

(Continued)

OTHER PUBLICATIONS

Cho Yoon Kyoung, Microfluidic Devices (KR 20170143310 A) Translated in English, Dec. 29, 2017, Korean Intellectual Property Office , p. 5 of attached translation (Year: 2017).*

(Continued)

*Primary Examiner* — Rebecca M Fritchman
*Assistant Examiner* — Mickey Huang
(74) *Attorney, Agent, or Firm* — Kilpatrick Townsend & Stockton LLP

(57) ABSTRACT

The present disclosure is notably directed to a microfluidic probe head, or MFP head, comprising a processing surface having a liquid injection aperture and a liquid aspiration aperture thereon. The aspiration aperture is generally shaped so as to partly extend around the injection aperture on the processing surface, although such injection apertures are not completely surrounded by the slit on the processing surface. Further, fluidic and solid barriers to aspiration are considered. The disclosure is further directed to related microflu- (Continued)

idic probe devices, and methods of operation of such an MFP head, notably to deposit cells on a surface.

20 Claims, 15 Drawing Sheets

Related U.S. Application Data

(60) Provisional application No. 62/626,607, filed on Feb. 5, 2018.

(52) U.S. Cl.
CPC . *B01L 2200/027* (2013.01); *B01L 2200/0642* (2013.01); *B01L 2200/0647* (2013.01); *B01L 2400/0487* (2013.01)

(56) References Cited

U.S. PATENT DOCUMENTS

| | | | | |
|---|---|---|---|---|
| 2010/0176089 | A1* | 7/2010 | Delamarche | C23F 1/08 216/90 |
| 2013/0333761 | A1 | 12/2013 | Delamarche et al. | |
| 2015/0075565 | A1 | 3/2015 | Foucault | |
| 2015/0140579 | A1 | 5/2015 | Chaibi et al. | |
| 2015/0376796 | A1* | 12/2015 | Uchiyama | C03C 17/28 156/345.11 |
| 2016/0168681 | A1* | 6/2016 | Duerig | B05C 3/02 427/430.1 |
| 2017/0304821 | A1 | 10/2017 | Kaigala et al. | |
| 2017/0370951 | A1 | 12/2017 | Buffiere et al. | |
| 2019/0366341 | A1* | 12/2019 | Cho | B01L 3/50273 |
| 2020/0360924 | A1 | 11/2020 | Uri et al. | |
| 2020/0363434 | A1 | 11/2020 | Buffiere et al. | |

FOREIGN PATENT DOCUMENTS

| | | | |
|---|---|---|---|
| WO | 2016113691 | A1 | 7/2016 |
| WO | 2019149955 | A1 | 8/2019 |

OTHER PUBLICATIONS

Melinda A. Lake, Microfluidic device design, fabrication, and testing protocols,, Feb. 22, 2017, ResearchGate, p. 16-22 (Year: 2017).*
Xander F. van Kooten, Passive removal of immiscible spacers from segmented flows in a microfluidic probe, Feb. 18, 2015, Applied Physics Letter, vol. 106, p. 1-2 (Year: 2015).*
Kazimierz Peszynski, Pneumatic sensors based on colliding curved wall jets, Mar. 12, 2015, Elsevier, Sensors and Actuators A 228, p. 1-3, 9-13. (Year: 2015).*
Brimmo et al., Microfluidic Probes and Quadrupoles: A new era of open microfluidics, 2017, IEEE Xplore (Year: 2017).*
International Search Report and Written Opinion dated Jun. 26, 2019 in International Patent Application No. PCT/EP2019/052743. 14 pages.
International Preliminary Report on Patentability dated Aug. 20, 2020 in International Patent Application No. PCT/EP2019/052743. 11 pages.
International Search Report and Written Opinion dated May 16, 2019 in International Patent Application No. PCT/IB2019/000007. 13 pages.
International Preliminary Report on Patentability dated Aug. 20, 2020 in International Patent Application No. PCT/IB2019/000007. 10 pages.
International Search Report and Written Opinion dated Mar. 8, 2016 in International Patent Application No. PCT/IB2016/050157. 12 pages.
International Preliminary Report on Patentability dated Jul. 18, 2017 in International Patent Application No. PCT/IB2016/050157. 10 pages.
Communication pursuant to Article 94(3) EPC dated Jun. 2, 2021 in EP Patent Application No. 19708944.4. 5 pages.
Communication pursuant to Article 94(3) EPC dated Jun. 16, 2021 in EP Patent Application No. 19708889.1. 6 pages.
Autebert, Julien et al.; "Hierarchical Hydrodynamic Flow Confinement: Efficient Use and Retrieval of Chemicals for Microscale Chemistry on Surfaces"; Langmuir; 2014; vol. 30, No. 12; pp. 3640-3645.
Juncker, David et al.; "Multipurpose microfluidic probe"; Nature Materials; Advance Online Publication (8 pages); Published: Jul. 24, 2005; vol. 4, No. 8; pp. 622-628.
Queval, Arthur et al.; "Design and Fabrication of a PDMS Microfluidic Probe and Perfusion Chamber for Microfluidic Experiments with Organotypic Brain Slices"; Twelfth International Conference on Miniaturized Systems for Chemistry and Life Sciences, MicroTAS 2008—San Diego, CA, USA; Duration: Oct. 12-16, 2008; Published: 2008; pp. 1663-1665.
Perrault, Cecile M. et al.; "Integrated microfluidic probe station"; Review of Scientific Instruments; Nov. 2010; vol. 81, No. 11; pp. 115107-1 to 115107-8 (9 pages).
Gervais, Thomas et al.; "Systematic analysis of microfluidic probe design and operation"; 2014 36th Annual International Conference of the IEEE Engineering in Medicine and Biology Society; Published: 2014; pp. 1567-1570 (5 pages).
Restriction Requirement dated Jan. 10, 2019 in U.S. Appl. No. 15/543,579, filed Jul. 14, 2017. 6 pages.
Non-Final Office Action dated Jun. 3, 2019 in U.S. Appl. No. 15/543,579, filed Jul. 14, 2017. 11 pages.
Final Office Action dated Dec. 10, 2019 in U.S. Appl. No. 15/543,579, filed Jul. 14, 2017. 9 pages.
Notice of Allowance dated Jun. 26, 2020 in U.S. Appl. No. 15/543,579, filed Jul. 14, 2017. 5 pages.
English translation of Office Action dated Nov. 3, 2021 in CN Patent Application No. 201980023755.4. 5 pages.
English translation of Office Action dated Nov. 26, 2021 in CN Patent Application No. 201980023904.7. 5 pages.
Communication pursuant to Article 94(3) EPC dated Jan. 31, 2022 in EP Patent Application No. 19708889.1. 6 pages.
Communication pursuant to Article 94(3) EPC dated Jul. 20, 2022 in EP Patent Application No. 19708889.1. 5 pages.
English translation of Office Action dated Aug. 18, 2022 in CN Patent Application No. 201980023904.7. 7 pages.
Non-Final Office Action dated Sep. 8, 2022 in U.S. Appl. No. 16/984,852, filed Aug. 4, 2020. 19 pages.
Chen, Yao et al.; "Effective insights into the geometric stability of symmetric skeletal structures under symmetric variations"; International Journal of Solids and Structures; 2015; vols. 69-70; pp. 277-290.
Communication pursuant to Article 94(3) EPC dated Feb. 21, 2023 in EP Patent Application No. 19708889.1. 8 pages.
English translation of Office Action dated Feb. 27, 2023 in CN Patent Application No. 201980023904.7. 7 pages.
Final Office Action dated Mar. 31, 2023 in U.S. Appl. No. 16/984,852, filed Aug. 4, 2020. 17 pages.
Non-Final Office Action dated Aug. 22, 2023 in U.S. Appl. No. 16/984,852, filed Aug. 4, 2020. 20 pages.
Qasaimeh, Mohammad A. et al.; "Microfluidic quadrupole and floating concentration gradient"; Nature Communications; Sep. 6, 2011; vol. 2, No. 464; 8 total pages.
Final Office Action mailed Feb. 16, 2024 in U.S. Appl. No. 16/984,852, filed Aug. 4, 2020. 18 pages.
Safavieh, Mohammadali et al.; "Two-Aperture Microfluidic Probes as Flow Dipoles: Theory and Applications"; Scientific Reports; 2015; vol. 5, No. 11943; pp. 1-15 (16 total pages).

* cited by examiner

MICROFLUIDIC PROBE HEAD WITH BARRIER PROJECTIONS

CROSS-REFERENCE TO RELATED APPLICATIONS

This application is a continuation application of International Patent Application No. PCT/EP2019/052743 entitled "MICROFLUIDIC PROBE HEAD WITH BARRIER PROJECTIONS," filed on Feb. 5, 2019, which claims priority to U.S. Provisional Patent Application No. 62/626,607, filed on Feb. 5, 2018; and is related to International Patent Application No. PCT/IB2019/000007, entitled "MICROFLUIDIC PROBE HEAD WITH ASPIRATION POSTS," filed concurrently on Feb. 5, 2019, the disclosures of which are hereby incorporated by reference in their entirety for all purposes.

TECHNICAL FIELD

The disclosure relates in general to the field of microfluidic probe (MFP) heads, MFP devices, and related methods of operation. In particular, it is directed to an MFP head designed for cell deposition.

BACKGROUND

Microfluidics deals with the behavior, precise control and manipulation of small volumes of fluids. The term microfluidics is broadly used with reference to volumes across several orders of magnitudes (e.g., from milliliter volumes down to nanoliter volumes). There are some characteristics of fluid flow that are often constrained to micrometer-length scale channels and to volumes typically in the sub-milliliter range, but can also be observed with respect to millimeter-length scale channels and milliliter volumes of fluid. Some features of microfluidics originate through the behavior that liquids exhibit at the millimeter length scale, the micrometer length scale, or shorter. The flow of liquids in microfluidics is typically laminar. Volumes well below one nanoliter can be reached by fabricating structures with lateral dimensions in the micrometer range. Microfluidic devices generally refer to microfabricated devices, which are used for pumping, sampling, mixing, analyzing, and dosing liquids, often (but not exclusively) at such sub-milliliter volumes. A microfluidic probe is a device for depositing, retrieving, transporting, delivering, and/or removing liquids, in particular liquids containing chemical and/or biochemical substances. For example, microfluidic probes can be used in the fields of diagnostic medicine, pathology, pharmacology and various branches of analytical chemistry. Microfluidic probes can also be used for performing molecular biology procedures for enzymatic analysis, ribonucleic acid (RNA) and/or deoxyribonucleic acid (DNA) analysis, and proteomics.

Performing local chemical alterations, sequentially, on a surface is very challenging. Implementing such processes of sequential chemistry conventionally requires relatively large volumes of processing liquid (in the range of tens of milliliters), and also often require flushing relatively large volumes of liquid to reduce contamination between consecutive liquids. In many conventional protocols, the techniques include drying out the surface; however, drying the surface is not always an available option for avoiding contamination, given the stage or processing for various applications.

Depositing cells in a homogeneous, rapid and specific manner at defined locations on a surface is particularly challenging, especially when willing to deposit cells on standard substrates in biology, such as glass slides, Petri dishes, and microtiter plates. The operation of a vertical microfluidic probe head tends to require operation at low fluid pressures to ensure desired deposition interaction, but it is difficult to control pressure in such heads with generally available pumps. Many such microfluidic probe heads also require extensive washing procedures during their operation.

BRIEF SUMMARY

The following presents a simplified summary of some embodiments of the disclosure in order to provide a basic understanding of the disclosure. This summary is not an extensive overview of the disclosure. It is not intended to identify key or critical elements of the disclosure or to delineate the scope of the disclosure. Its sole purpose is to present some embodiments and aspects of the disclosure in a simplified form as a prelude to the more detailed description that is presented later.

According to a first aspect, the present disclosure is embodied as a microfluidic probe head, or MFP head, having a processing surface with a liquid injection aperture and a liquid aspiration aperture thereon. The aspiration aperture can be a slit, shaped so as to partly extend around the injection aperture on the processing surface, whereby the injection aperture is not completely surrounded by the slit on the processing surface.

In such embodiments, the slit can be regarded as a convex arc, partly surrounding the injection aperture, and the actual shape of the slit impacts the confinement of the injected liquid, as well as the pattern formed by material accordingly deposited. Because the aspiration aperture slit partly extends around the injection aperture, the injected liquid can more easily be confined, compared to a point-like injection aperture, in operation of the head. Even though the aspiration aperture may not completely surround an injection aperture, a flow confinement of the injected liquid can nevertheless be obtained. In addition, immersion liquid in the vicinity of the MFP head can be aspirated via the aspiration slit, and the aspiration can be controlled to an extent such that the flow velocity of the injected liquid can be set essentially independently from the aspiration flow. This provides flexibility in operating the head and, in turn, eases liquid deposition on surfaces. In addition, the barrier created by the liquid aspiration helps to improve homogeneity in particles (e.g., cells) deposited thanks to the injected liquid.

The present MFP head concept enables the deposition of cells in a homogeneous, rapid, and specific manner at defined locations on a surface, in particular when depositing cells on substrates such as glass slides, Petri dishes, and microtiter plates. The present MFP head further allows for analytes in samples (e.g., antibodies in plasma) to be injected and bind to capture reagents on substrates while the sample is being aspirated off the plate. This is an advantage over other methods in which some amount of time of the sample resting and incubating on the surface with capture reagents is required.

In some embodiments, the aspiration slit on an MFP head is curved, and can be shaped as a block arc, or in other words, the curved slit can extends along a portion of a circle. Curved aspiration apertures are advantageous in that the partial radial symmetry that results allows the MFP head to be scanned in a range of directions across a sample surface, with minimal impact on the pattern created by the injected liquid on the surface. In variants, slits arranged along polygonal edges might be used, e.g., extending along a rectangular shapes. It can be understood that for applications where the MFP head moves horizontally for deposition of a sample or cells, certain slit geometries will result in higher homogeneity of deposition than others but with limited independence with relation to a scan direction. For instance, aspiration slits arranged along a rectangular shape result in more homogeneous deposition if the head is scanned along a direction parallel to a side of the rectangular shape. Conversely, curved slits, for example extending along portions of a same circle, will create a gradient in the superficial density of deposited material, perpendicularly to the scanning direction, due to different residence times of particles above the surface. Accordingly, a thinner and denser pattern is obtained with curved slits, all things otherwise equal, as compared to a rectangular shape.

In other embodiments, the processing surface may comprise two or more liquid injection apertures aligned on said processing surface. In alternative embodiments, a single aspiration slit may be relied on, which has a wavy or undulating shape, so as to extend partly around each of the two or more injection apertures on the processing surface. Such a shape exhibits alternating curvatures, following a winding course around the injection apertures.

More generally, the processing surface may have one or more liquid injection apertures and one or more liquid aspiration apertures. In some embodiments, the aspiration apertures include one or more slits extending along a curved direction, so as to partly extend around the set of injection apertures on the processing surface. In other words, the injection apertures are not completely surrounded by the one or more slits on the processing surface.

The centroid of the set of injection apertures (on the processing surface) is preferably located within the interior region of the osculating circle of the curved direction. This way, the slit portions are reasonably curved around the injection apertures and do not bend too acutely, which results in smooth liquid barriers around the injected (and confined) liquid. Such an MFP head can advantageously be used for cell deposition as this configuration favors homogeneous deposition on a sample surface and is relatively independent from the scanning direction.

For example, each slit can extend partly along a circle centered on a centroid of the liquid injection apertures on the processing surface. That is, each slit extends along a portion of that circle. Using multiple injection apertures allows simultaneous injection of liquid. Such a geometry generates a stagnation zone at the level of the centroid of the injection apertures, which improves material deposition on the processed surface.

In embodiments, the head has two layers, including a capping layer and a liquid routing layer. A bottom face of the capping layer covers a top face of the liquid routing layer. The processing surface is defined by the bottom face of the liquid routing layer, opposite to the top face thereof. The liquid routing layer includes the liquid injection aperture and the liquid aspiration aperture, each defined on its bottom face. It further includes at least one liquid injection channel and at least one liquid aspiration channel, each in fluid communication with said liquid injection aperture and said liquid aspiration aperture, respectively, through respective vias extending as through-holes through a thickness of the liquid routing layer. This markedly eases the fabrication of the head.

In some aspects, one or more additional apertures can be arranged on the processing surface and shaped so as to extend partly around the liquid aspiration aperture(s), on the processing surface. The additional apertures can be used to improve liquid confinement or for rinsing purposes, in operation, for example, rinsing over the deposited cells can be achieved by flushing immersion liquid in which the head is immersed.

In some embodiments, the processing surface further includes a protruding structure, having a flat surface protruding from the processing surface, and shaped so as to extend around the injection aperture. Such a protruding structure provides mechanical pinching, to increase or force the interaction of the cells within a sample fluid within the area of hydrodynamically confined liquid flow in contact with the processed surface. This is all the more efficient when using concentric apertures. For example, the average diameter of the protruding structure can be between 340 μm and 2200 μm, and the average width of the protruding structure can be between 100 μm and 650 μm.

In embodiments, several protruding structures are involved. The above protruding structure may for instance be a first protruding structure, which protrudes from the processing surface between the injection aperture and the aspiration aperture. In addition, a second protruding structure may be defined on the processing surface, which also has a flat surface protruding from the processing surface. The second protruding structure is shaped so as to extend around the aspiration aperture.

According to another aspect, the disclosure is embodied as a microfluidic probe device, or MFP device, having an MFP head according to any of the embodiments evoked above. The MFP device is configured to inject liquid via the injection aperture and aspirate liquid from the aspiration aperture.

According to a further aspect, the disclosure is embodied as a method of operating an NFP head according to any of the embodiments above. The method comprises: positioning the NFP head in proximity with a sample surface to be processed, so as for the processing surface of the head to face the sample surface. Then processing liquid is injected via the liquid injection aperture while liquid is aspirated from the aspiration aperture, to process the sample surface.

In embodiments, the processing liquid is a heterogeneous suspension comprising cells, and processing liquid is injected so as to deposit cells of the heterogeneous suspension onto the sample surface.

In some implementations, particularly with sample wells as the sample surface, the sample surface is first immersed in an immersion liquid. Thus, the NFP head will be completely immersed in the immersion liquid, when positioning it above the sample surface. In operation, the one or more additional apertures of the head can be used to inject or aspirate liquid, while otherwise aspirating liquid from the first aspiration aperture. In such embodiments, the steps of injecting the processing liquid and aspirating liquid are performed so as to maintain a hydrodynamic flow confinement of injected liquid between the injection aperture and the aspiration aperture.

Devices and methods embodying the present disclosure will now be described, by way of non-limiting examples, and in reference to the accompanying drawings. Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

Illustrative aspects and embodiments are described in detail below with reference to the following drawing figures.

Figure 1:
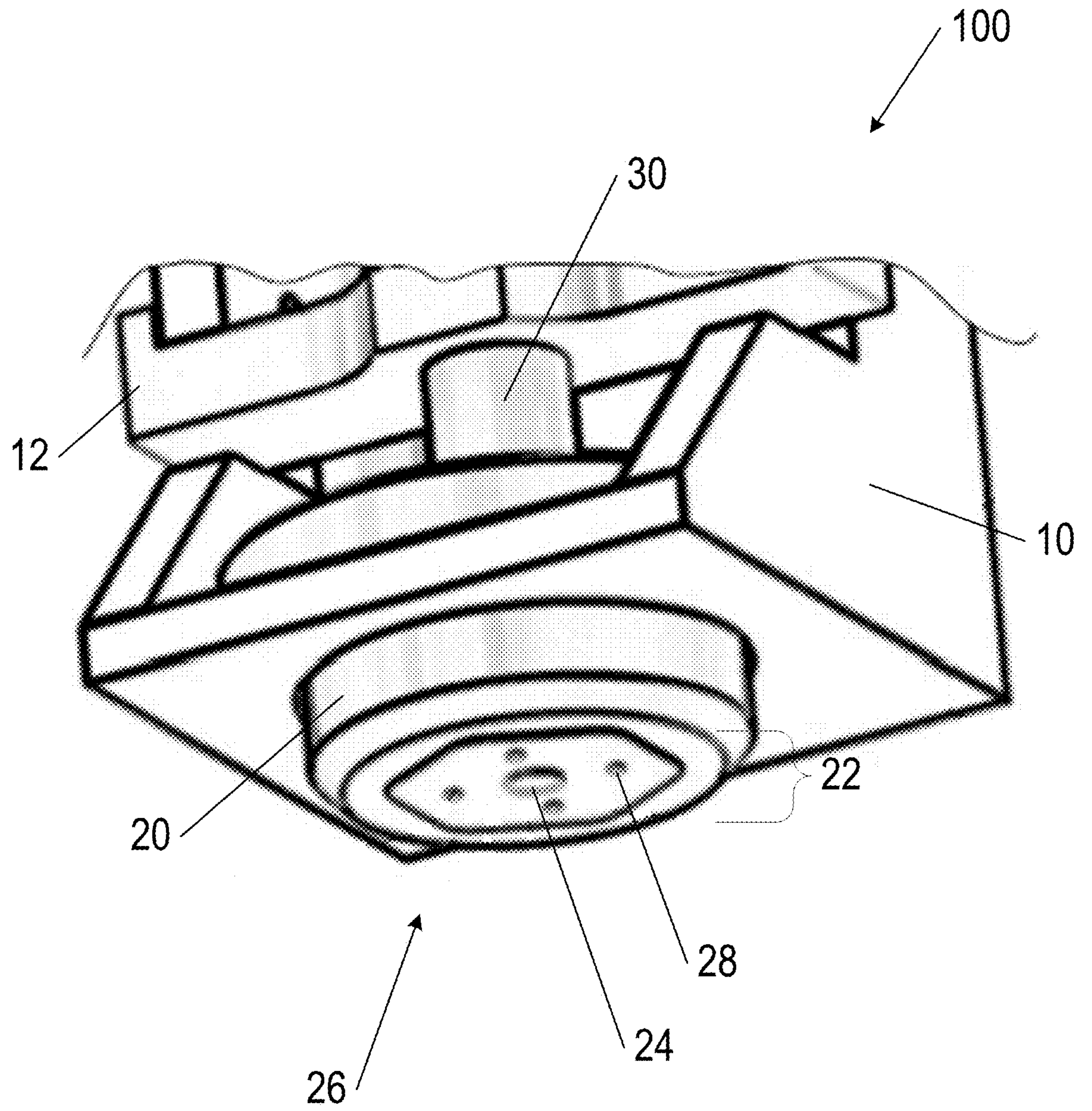
FIG. 1 shows a partial perspective view illustration of an NFP device, according to embodiments of the present disclosure.

The accompanying drawings show simplified representations of devices or parts thereof, as involved in embodiments. Technical features depicted in the drawings are not necessarily to scale. Similar or functionally similar elements in the figures have been allocated the same numeral references, unless otherwise indicated.

DETAILED DESCRIPTION

Throughout this description for the purposes of explanation, numerous specific details are set forth in order to provide a thorough understanding of the many embodiments disclosed herein. It will be apparent, however, to one skilled in the art that the many embodiments may be practiced without some of these specific details. In other instances, well-known structures and devices are shown in diagram or schematic form to avoid obscuring the underlying principles of the described embodiments.

The systems and methods described herein facilitate the automation of fluid sample analysis, such as blood analysis. With regard to immunohematology, the systems and methods can be used for detection of grouping and phenotyping, for the screening and/or identification of antibodies, cross-matching and direct antiglobulin test.

In some implementations of the systems and methods described herein, microfluidic testing can be applied in toward regenerative medicine. In other implementations, the systems and methods described herein can be applied toward toxicology studies, or platelet deposition processes.

Some techniques of immunohematology testing involve "scanning" a blood sample across a broad array of reactants (horizontally, across the X-Y axes of a sample surface), which carries some inherent risk of signal mixing, cross-contamination, and the like. Earlier attempts to use microfluidics employed channels exposed on a fluidic head, but these lacked the hydrodynamic flow control of the present disclosure.

Control of fluid by hydrodynamic flow confinement ("HFC") also allows for sequential chemistry reactions to be performed within the same sample well, with the injection of processing fluids having samples and/or reagents alternating with injection of buffer or rising fluids. The HFC of the MFP head provides for sequential reactions (e.g. anti-body screening assays) to be carried out within the same sample well without significant concern for cross-contamination or other such errors, due to the alternating rinsing and overall control of the fluids beneath the processing surface of the MFP head. Such sequential chemistry implementations will typically employ a MFP head with two or more injection channels, each injection channel delivering a different fluid, so as to reduce the risk of signal mixing or cross-contamination, and so as to reduce or eliminate the need for intermediary washing steps. In some sequential chemistry implementations, a MFP head with a single injection channel can be used, with a washing step occurring in between injections of active reagents or solutions.

Generally speaking, HFC relates to a laminar flow of liquid, which is spatially confined within an environmental liquid (alternatively referred to as an immersion liquid). In particular, aspiration apertures, optionally in combination with mechanical or liquid barrier elements, set the boundaries of HFC for a given MFP head and maintain desired flow characteristics of the injected processing liquid(s) within or underneath a specific region of an MFP head. Some embodiments and aspects of the present disclosure advantageously rely on hydrodynamic flow confinement as further described herein.

Devices and systems as considered herein can include other structures or means as are usual in microfluidics (e.g., tubing ports, valves, pumping means, vacuum sources) and can be configured to provide for HFC of the processing liquid(s) injected through the injection aperture(s). It can be understood that the MFP head and HFC of the present disclosure can be implemented in various embodiment of fluid handling systems capable of performing a wide range of chemistries on or within various plate, wells, slides, or the like. Components of the MFP heads and their processing surfaces can be constructed or formed from generally bio-compatible materials including, but not limited to, ceramics, plastics, polymers, glass, silicon, metals (e.g. aluminum, stainless steel, etc.), alloys, or combinations thereof.

The variations of the MFP heads discussed in detail below include processing surfaces that have one or more aspiration slits (or slots) that are shaped so as to partly (but not completely) extend around or surround an injection aperture. Such aspiration apertures can also be said to be, partly coiled, bent, curved, or otherwise arranged around the injection aperture. Because the aspiration aperture(s) extends partly around the injection aperture, a degree of confinement of the injected liquid can be obtained during operation of the MFP head. That is, injected liquid remains confined due to liquid aspirated at the slit, which thereby forms a barrier extending around the injected liquid. This barrier created by the liquid aspiration helps to improve homogeneity of cells or particles within in the deposited liquid. Meanwhile, the shape of the slit allows immersion liquid in the vicinity of the head to be aspirated via the slit during operation. This allows the flow velocity of the injected liquid to be set partly (if not essentially) independent from the aspiration flow, which, in turn, eases the operation of the head.

Further variations of the MFP head and processing surfaces considered below include alternative or additional liquid and mechanical barriers. In some aspects, a secondary, shaping liquid can be used to affecting the flow and direction of the injected liquid having sample or cells of interest. In other aspects, a solid structure can extend from the processing surface, affecting the flow and direction of the injected liquid having sample or cells of interest. In both cases, the liquid or solid barriers positioned between the injection and an aspiration apertures guide, push, or pinch the injected fluid such that the injected fluid can improve and even maximize contact with an underlying sample surface (e.g., glass slides, Petri dish, microtiter plates or wells, etc.) thereby improving deposition, bonding, or interaction of cells and/or analytes in the injected fluid with the sample surface.

As used herein, unless otherwise indicated, the term "microfluidic" refers to the handling of fluid volumes that deal with the behavior, precise control, and manipulation of small volumes of fluids, ranging from milliliter volumes to nanoliter volumes, and increments and gradients of volume therein. Accordingly, "microfluidic probe heads" (MFP heads) generally refer to probe heads that are part of miniaturized fluid-transport systems and devices, capable of handling and processing fluid volumes ranging from milliliter volumes to nanoliter volumes, and increments and gradients of volume therein. Where specifically indicated, certain implementations of microfluidic devices and/or probe heads are constrained to micrometer-length scale channels and to volumes typically in the sub-milliliter range.

As used herein, unless otherwise indicated, the term "mesa" generally refers to the processing surface of an MFP head, inclusive of (but not limited to) the apertures for aspiration, apertures for deposition, apertures for contour and mesa shape control, barriers, contours, step-features, rounded corners, and other such structural aspects that forms a processing surface for the MFP head.

As used herein, unless otherwise indicated, the term "about" is used to provide flexibility to a numerical range endpoint by providing that a given value may be greater than or less than the indicated value. In particular, the given value modified by about may be at or within ±10% from that value.

As used in this specification and the appended claims, the singular forms "a", "an", and "the" include plural referents unless the content clearly dictates otherwise. Thus, for example, reference to a system comprising "a binding agent" includes system comprising one or more binding agents. Likewise, reference to "a substance" includes one or more substances.

Microfluidic Probe Head Structures

As shown in FIG. 1, the partially depicted device 100 has a holder 10 configured for receiving an MFP head 20, the MFP head 20 having a mesa 22 which includes an aperture 24, which generally defines a processing surface 26. In some embodiments, supporting posts 28 can be provided on the MFP head 20 for leveling purposes. A frame 12, on top of the holder 10, is provided for mounting the head to positioning structures that can include, e.g., a goniometer on top of the MFP head 20 (not shown in FIG. 1), to allow the MFP head 20 to be positioned (vertically, along a z-axis) and rotated to a precise angular position. Conduit 30, providing channels for fluid flow and/or vacuum to processing surface 26 of MFP head 20 can be supported by holder 10 and frame 12, as the device 100 moves during the course of operation.

The device 100 may include other structures or means as usual in microfluidics (e.g., tubing ports, valves, pumping means) and may be configured to provide for hydrodynamic flow confinement (HFC) of the processing liquid(s) injected through the injection aperture(s). Generally speaking, HFC relates to a laminar flow of liquid, which is spatially confined within an environmental liquid (or immersion liquid). In particular, aspiration apertures, optionally in combination with mechanical or liquid barrier elements, set the boundaries of HFC for a given MFP head and maintain desired flow characteristics of the injected processing liquid(s). Some embodiments and aspects of the present disclosure advantageously rely on HFC.

Injection apertures, aspiration apertures, and optional liquid barrier formation apertures are typically in fluid communication with corresponding microchannels within the body of an MFP head, which can themselves be connected to pumping means, so as to allow liquid to be dispensed (i.e., injected) through injection apertures liquid to be aspirated through the aspiration apertures, or for a liquid barrier fluid to be controlled along the processing surface of an MFP head.

Embodiments and aspects of the present devices and methods allow analytes in a sample (e.g., blood cells or antibodies) to be deposited in a homogeneous, rapid, and specific manner on a sample surface S, at defined locations, from a heterogeneous suspension. The present approach eases the deposition of analytes on standard substrates, such as glass slides, Petri dishes, and microtiter plates (e.g. microplates with 6, 24, or 96 sample wells). The MFP head 20 can be moved horizontally or vertically, or both, as appropriate for controlling fluid flow and/or vacuum at the processing surface 26, such that the MFP head 20 can move as appropriate for deposition and aspiration at, on, or along the corresponding sample surface S. In the exemplary embodiments considered herein, all of a targeted spot on the respective processing surface is covered, achieving homogeneous binding over that area.

Figure 2A:
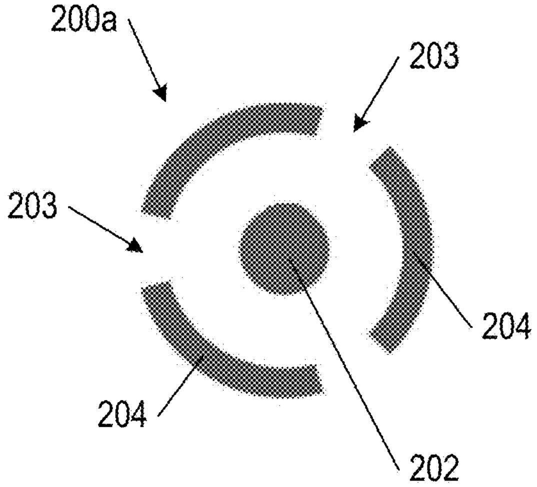
FIGS. 2A-2O depict views of mesa layouts, having apertures, barriers, and/or other structures formed in or on the processing surfaces of MFP heads, according to various embodiments of the present disclosure.
Figure 2B:
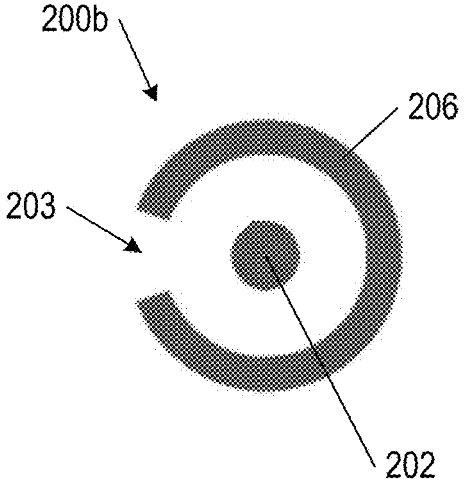
Figure 2C:
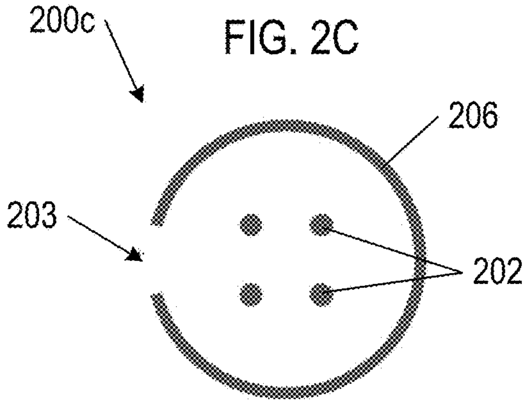
Figure 2D:
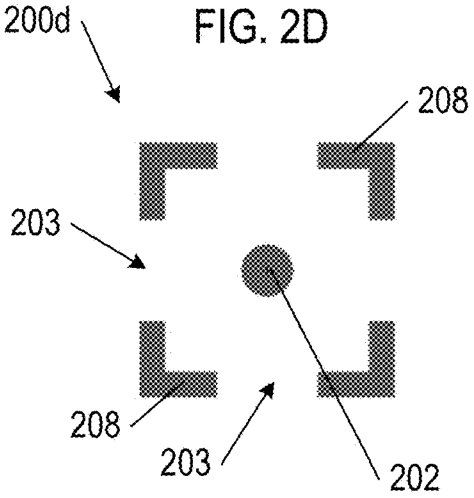
Figure 2E:
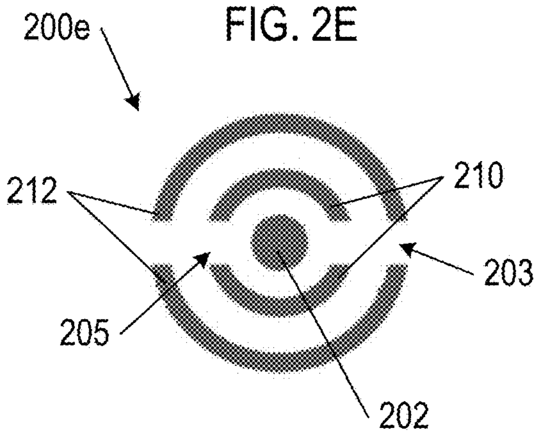
Figure 2F:
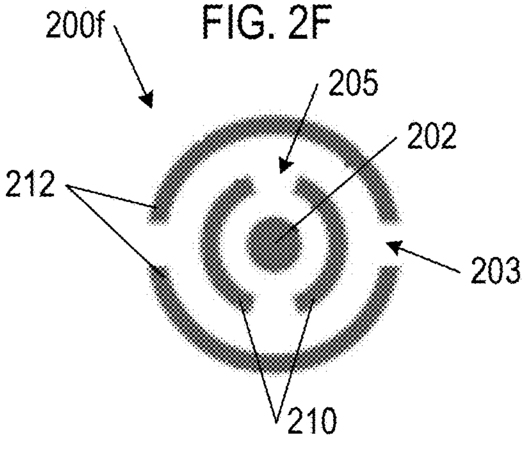
Figure 2G:
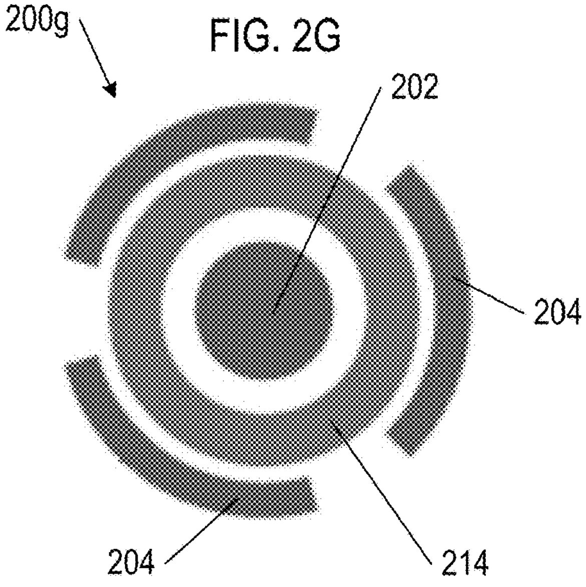
Figure 2H:
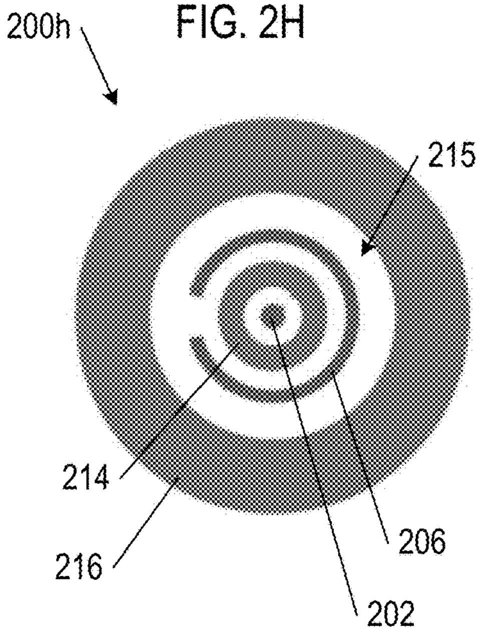
Figure 2I:
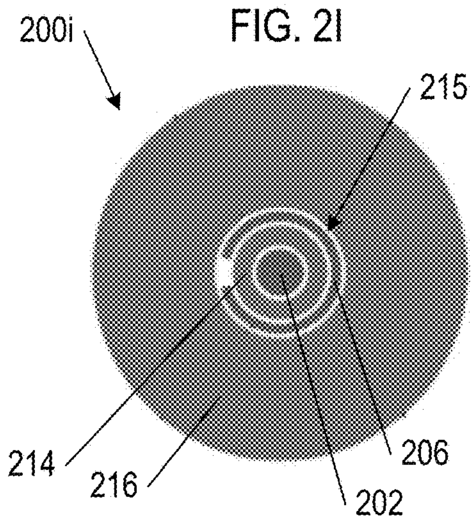
Figure 2J:
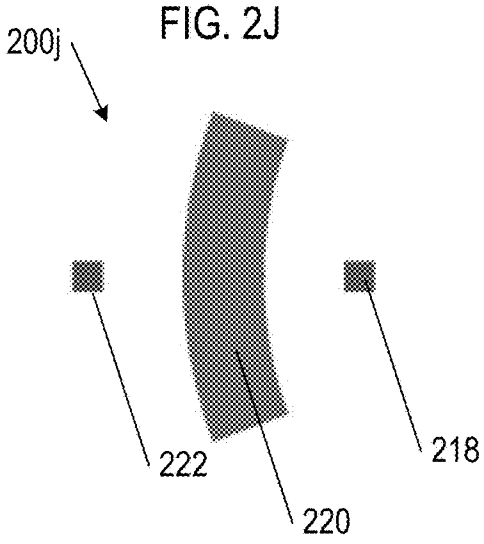
Figure 2K:
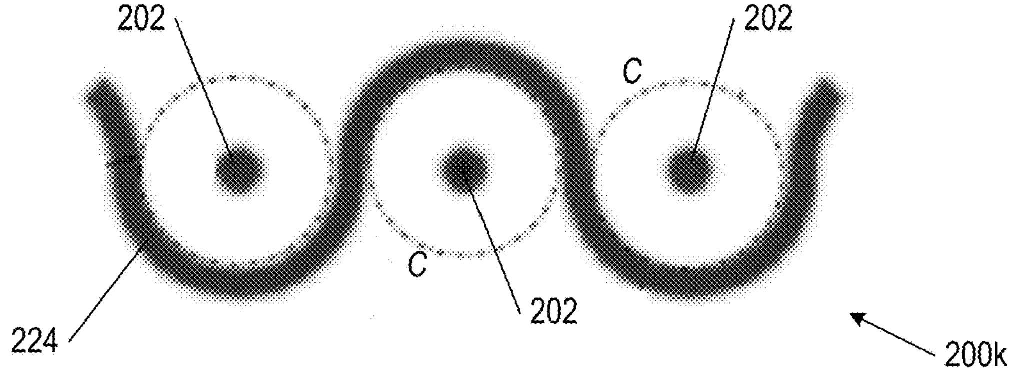
Figure 2L:
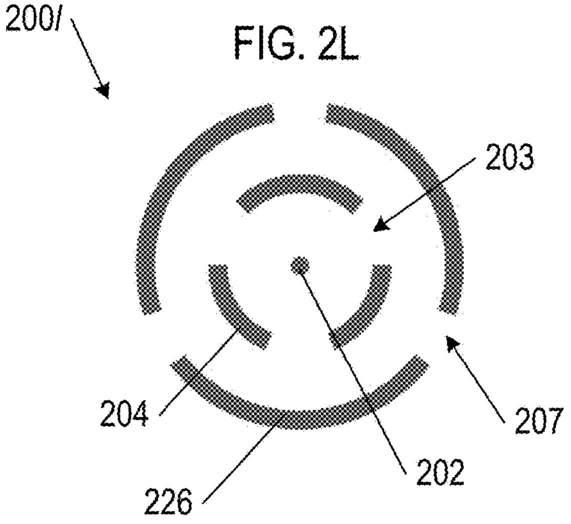
Figure 2M:
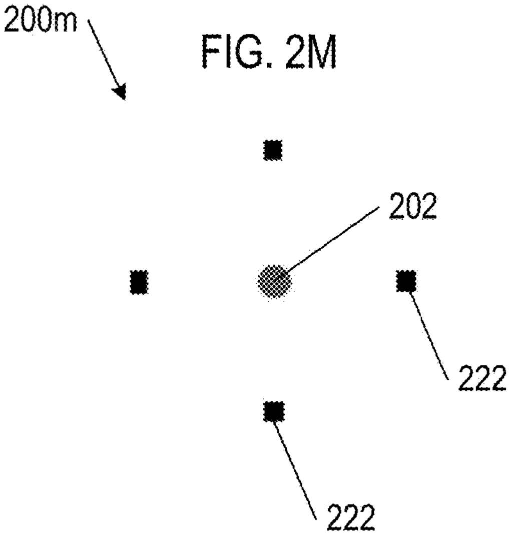
Figure 2N:
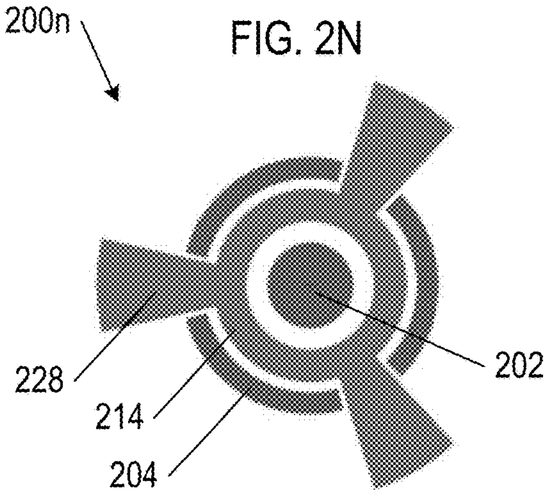
Figure 2O:
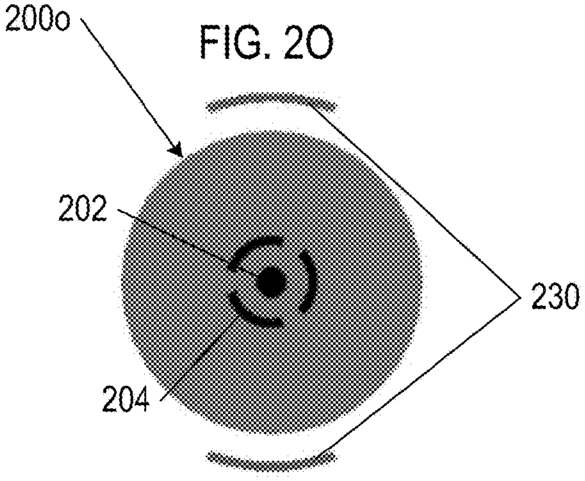

FIGS. 2A-2O depict various embodiments of mesa layouts for MFP heads, with configurations and arrangements of aspiration apertures, deposition apertures, contour control apertures, barriers, and other structural features forming the processing surface of such MFP heads. The structures forming such features can have contours and arrangements that are stepped, rounded, or otherwise configured to control fluid flow or vacuum draw. All of the embodiments shown in FIGS. 2A-2O can be applied to a mesa layout for a processing surface, such as for example, mesa 22 on processing surface 26 for MFP head 100 in FIG. 1.

Generally, in embodiments of the present MFP heads 100, the average diameter of any given injection aperture is between 25 μm and 150 μm, and can be a diameter at any increment, gradient, or range therein. For example, the average diameter of an injection aperture can be approximately 50 μm or 100 μm. Alternatively, an injection aperture need not necessarily be a rounded hole, for example, an injection aperture may have a square, rectangular, triangular, or notched shape. The average width of aspiration slits or apertures disclosed herein can be between from 25 μm to 200 μm, and can be at any increment, gradient, or range therein. For example, in embodiments where the aspiration slit(s) extend(s) along a circle, the average diameter of the inner edge of the circle (along which the proximal edge of the slit extends) can be between 240 μm and 400 μm, while the average diameter of the outer edge circle (along which the distal edge of the slit extends) can be between be of 400 μm to 500 μm. The minimum distance between the injection apertures and aspiration apertures is between from 10 μm to 10.0 mm, and can be at any increment, gradient, or range therein. Some specific embodiments can have a minimum distance between the injection apertures and aspiration apertures between 50 μm to 2.0 mm.

The MFP head can be made of a double-sided, polished silicon wafer. On one side of the wafer, the channels for fluidic connections are etched, while on the other side the mesa structures are etched, which act as the apex. The various injection and aspiration apertures are formed by etching through wafer vias. A glass wafer can be anodically bonded onto the side of the silicon wafer with the channels. The glass wafer can have pre-drilled vias to match with and complete the fluidic connection channels. After cutting or dicing, this glass "lid" can be slightly larger than the silicon wafer, which can support the MFP head for accurate placement in the head of a holder. In other embodiments, MFP heads can be 3D printed, forming the desired internal channel structures.

Variations of the processing surface 26 may be provided with one or more liquid injection apertures and one or more liquid aspiration apertures thereon. The processing surface 26 may for instance have only one liquid aspiration slit. Another variation of the processing surface 26 may have a unique aspiration slit that extends around a unique injection aperture, or around multiple injection apertures. Embodiments with multiple injection apertures can be arranged according to a bi-dimensional pattern, with rotational symmetry, or instead have a linear arrangement.

In many embodiments, the MFP head 100 comprises n liquid aspiration slits on the processing surface 26 (n≥2), each shaped so as to extend partly around an injection aperture on the processing surface 24. The n aspiration slits can be arranged to have rotational symmetry of order n on the processing surface 26. The gaps remaining between two neighboring slit portions are symmetrically distributed, so as to lower the influence of a scanning direction on deposited material. Each of the two or more slit portions may, for instance, extend partly along a same circle on the processing surface 26. In variants, such slit portions may extend along a polygon.

Similarly, in other embodiments, an MFP head can have more than one injection aperture, where those injection apertures can be arranged to have rotational symmetry on the processing surface.

One or more aspiration apertures arranged along the perimeter of the same circle can have a cumulated length that amounts to 55% to 95% of a perimeter of that same circle. Thus, the injection aperture is essentially surrounded by the aspiration apertures or slits (though not completely), which favors liquid confinement and lessen the impact of gaps between the slits on the pattern obtained when scanning the head.

FIG. 2A shows a first variation of an MFP head mesa layout for a processing surface. In particular, injection aperture 202 is positioned in the center of the mesa 200*a* with three aspiration apertures 204 positioned around the injection aperture. In mesa 200*a*, the three aspiration apertures 204 are in the form of aspiration slits, equal in length, partially surrounding the injection aperture 202, and each equidistant from the injection aperture 202. Each of the three aspiration aperture 204 slits are also spaced equally apart from each other, thereby forming gaps 203 between the aspiration apertures 204 at the same distance from the injection aperture 202. Further, each of the three aspiration aperture 204 can span from about 85° to 115° of curvature, and the gaps 203 therebetween fill corresponding degrees of curvature. Accordingly, mesa 200*a* has a central injection aperture 202 with three aspiration aperture 204 slits and three gaps 203 forming a perimeter or circumference around the injection aperture 202.

Aspiration apertures having the general arrangement or configuration as shown in FIG. 2A can alternatively be referred to as a three-break circular aperture set, three-gap circumference apertures, or the like. An exemplary mesa 200*a* as shown in FIG. 2A can have: injection aperture 202 with a radius of about 75 μm and three aspiration apertures 204 having interior edges about 200 μm distant from the center of injection aperture 202 and exterior edges about 250 μm distant from the center of injection aperture 202. In many aspects, the three aspiration apertures 204 will have equal widths, although in alternative aspects the three aspiration apertures 204 can have differing widths, to selectively control aspiration and flow of the MFP head.

FIG. 2B shows a second variation of an MFP head mesa layout for a processing surface. In particular, injection aperture 202 is positioned in the center of the mesa 200*b* with a single aspiration aperture 206 positioned around the injection aperture. In mesa 200*b*, the single aspiration aperture 206 is in the form of an aspiration slit extending almost completely around, but not completely surrounding, the injection aperture 202. The single aspiration aperture 206 generally forms a circular shape around the injection aperture, and can span from about 300° to 350° of curvature, with the gap 203 between the two ends of single aspiration aperture 206 filling the corresponding degrees of curvature. Accordingly, mesa 200*b* has a central injection aperture 202 with the single aspiration aperture 206 slit and single gap 203 forming a perimeter or circumference around the injection aperture 202. An exemplary mesa 200*b* as shown in FIG. 2B can have: an injection aperture 202 with a radius of about 50 μm, a single aspiration aperture 206 that has an interior radial edge about 150 μm distant from the center of injection aperture 202, and an exterior radial edge about 200 μm distant from the center of injection aperture 202.

FIG. 2C shows a third variation of an MFP head mesa layout for a processing surface. In particular, four injection apertures 202 are positioned toward the center of the mesa 200*c* with a single aspiration aperture 206 positioned around the injection aperture. In mesa 200*c*, the four injection apertures 202 are arranged relative to each other equidistant from a central point, similar to the corners of a square. Further, the single aspiration aperture 206 is in the form of an aspiration slit extending almost completely around, but not completely surrounding, the injection apertures 202. The single aspiration aperture 206 generally forms a circular shape around the injection aperture, and can span from about 300° to 350° of curvature, with the gap 203 between the two ends of the single aspiration aperture 206 filling the corresponding degrees of curvature. Accordingly, mesa 200*c* has four injection apertures 202 with the single aspiration aperture 206 slit and single gap 203 forming a perimeter or circumference around the injection apertures 202. An exemplary mesa 200*c* as shown in FIG. 2C can have: injection apertures 202 each with a radius of about 50 μm, a single aspiration aperture 206 that has an interior radial edge about 450 μm distant from a centerpoint of the mesa 200*b* between the injection apertures 202 (often equidistant between the injection apertures 202), and an exterior radial edge about 500 μm distant from said centerpoint of injection apertures 202.

Using multiple injection apertures 202 allows simultaneous or sequential injections of multiple liquids via the injection apertures 202, which generates a stagnation zone in the center, due to the partly surrounding single aspiration aperture 206 or slit. The number and arrangement of the injection apertures 202 alter the shape of the stagnation zone and may be configured to improve the material deposition on the processed surface. The number of injection apertures 202 forming a plurality of injection apertures can vary, for example from three (3) apertures to more than ten (10) apertures. Generally, the injection apertures 202 will be equal in size, but can have different sizes and shapes to control the shape and flow of the stagnation zone in between the injection apertures 202.

Both FIG. 2B and FIG. 2C show a version of the single aspiration aperture 206 almost completely surrounding their respective injection apertures 202, having differences in the width of the single aspiration aperture 206 and in the degree of circumference or perimeter by which each single aspiration aperture 206 encircles their respective injection apertures 202. An aspiration aperture having the general shape or curvature as shown in FIG. 2B and FIG. 2C can alternatively be referred to as a single-break circular aperture, a one-gap circumference aperture, or the like. Further, it can be appreciated that a single aspiration aperture 206 as shown in FIG. 2B and FIG. 2C can have an opening with a width of from about 50 μm to about 250 μm, or at an increments, gradient, or range therein. In many aspects, a single aspiration aperture 206 will have an equal width along its length, although in alternative aspects a single aspiration aperture 206 can have a varying width, to selectively control aspiration and flow of the MFP head.

In all of FIGS. 2A, 2B, and 2C, the one or more aspiration slit portions essentially enclose their respective injection apertures 202. In these embodiments, the cumulative length of the three aspiration apertures 204 or the single aspiration aperture 206 amounts to 55% to 95% of the perimeter of the (inner or outer) circle along which they extend. Conversely, the remaining gaps 203 extend over a cumulated or single length that amounts to 5% to 45% of the perimeter of that circle. In some particular embodiments, the cumulated length of the aspiration slits amounts to between 65% and 85% of the perimeter of said circle, such as 75% of the perimeter of said circle. Similarly, the mesa arrangements seen in FIGS. 2D-2I, 2L, and 2N-2O below can also have a cumulative aspiration perimeter spanning from 55% to 95% of the given circumference or perimeter.

In such cases, the injection aperture is essentially surrounded by the aspiration slit(s), though not completely. As a consequence, the flow velocity of the injected liquid can be made essentially independent from the aspiration flow, thanks to the comparatively higher volume of immersion liquid available at the aspiration aperture for aspiration. This relative independency can be advantageously exploited: for example, injection can be stopped or paused for a period of time to allow for cell sedimentation to take place.

FIG. 2D shows a fourth variation of an MFP head mesa layout for a processing surface. In particular, injection aperture 202 is positioned in the center of the mesa 200*d* with four cornered aspiration apertures 208 positioned around the injection aperture. In mesa 200*d*, the four cornered aspiration apertures 208 are arranged to form a generally square configuration, with the aspiration slits positioned at the corners of that square arrangement. The four cornered aspiration apertures 208 are equal in length and shape, each forming a right angle (90° corner) facing the centrally located injection aperture 202, and each equidistant from the injection aperture 202. Each of the four cornered aspiration apertures 208 are also spaced equally apart from each other, thereby forming gaps 203 between the four cornered aspiration apertures 208 at the same distance from the injection aperture 202. Accordingly, mesa 200*d* has a central injection aperture 202 with four cornered aspiration aperture 208 slits and four gaps 203 forming a generally square or rectangular perimeter around the injection aperture 202.

The generally square aspiration arrangement carries unique advantageous, in that the residence time for all cells is more equal underneath an MFP Head with a square aspiration. Thus, when scanning, the square-shape of the aspiration draw is not as prone to a gradient along an X-Y axis. Contrasting the geometries of FIGS. 2C and 2D, the design of FIG. 2C allows an MFP head to be scanned along axis X, with the gap on the trailing edge, so as to obtain a profile of deposited material that is peaked at the center of the ring 202. The position of the gap (on the trailing edge) does not adversely impact the deposited material. Using the design of FIG. 2D, the head can be scanned along axis X or Y, with the gap on the trailing edge, which will result in a somewhat more homogeneous deposition. As it can be also realized, the MFP head can also be scanned diagonally, which will again result in a symmetric pattern of deposited material. Thus, as one understands, rotational symmetry makes the deposited pattern relatively independent from the scanning direction.

Aspiration apertures having the general arrangement or configuration as shown in FIG. 2D can alternatively be referred to as a four-corner aperture set, corner apertures, or the like. Further, it can be appreciated that four cornered aspiration apertures 208 as shown in FIG. 2A can have openings with widths of from about 50 μm to 250 μm. In many aspects, the both legs of each four cornered aspiration apertures 208 will have equal widths, although in alternative aspects the legs of any one of the four cornered aspiration apertures 208 can have different widths, to selectively control aspiration and flow of the MFP head. It can be further appreciated that such a variation using cornered apertures is not limited to four apertures positioned to form a generally rectangular pattern. Alternative configurations can have three cornered apertures with slits forming 120° angles arranged as a triangle positioned around a central injection aperture, five cornered apertures with slits forming 72° angles arranged as a pentagon positioned around a central injection aperture, six cornered apertures with slits forming 60° angles arranged as a hexagon positioned around a central injection aperture, or the like.

FIG. 2E shows a fifth variation of an MFP head mesa layout for a processing surface. In particular, injection aperture 202 is positioned in the center of the mesa 200*e* with two pairs of concentric hemispherical apertures positioned around the injection aperture 202. In mesa 200*e*, both pairs of hemispherical apertures are arranged with rotational symmetry about the injection aperture 202. The interior hemispherical apertures 210 can be aspiration apertures configured for aspiration for HFC of fluid injected through the injection aperture 202, accordingly, interior hemispherical apertures 210 can be alternatively referred to as HFC aspirators. The two interior hemispherical apertures 210 are separated by interior gaps 205. The exterior hemispherical apertures 212 are aspiration apertures configured for rinsing accordingly, the exterior hemispherical apertures 212 can be alternatively referred to as rinsing aspirators. The two exterior hemispherical apertures 212 are separated by (in this case, exterior) gaps 203. In the implementation shown by FIG. 2E, the interior gaps 205 and gaps 203 are coaxial, providing for a similar aspiration flow and direction of aspiration for both the HFC aspirators and the rinsing aspirators.

FIG. 2F shows a sixth variation of an MFP head mesa layout for a processing surface. Similar to the implementation shown in FIG. 2E, injection aperture 202 is positioned in the center of the mesa 200*e* with two pairs of concentric hemispherical apertures positioned around the injection aperture 202. In mesa 200*e*, both pairs of hemispherical apertures are arranged with rotational symmetry about the injection aperture 202. The interior hemispherical apertures 210 can be aspiration apertures configured for aspiration for HFC of fluid injected through the injection aperture 202, accordingly, interior hemispherical apertures 210 can be alternatively referred to as HFC aspirators. The two interior hemispherical apertures 210 are separated by interior gaps 205. The exterior hemispherical apertures 212 are aspiration apertures configured for rinsing accordingly, the exterior hemispherical apertures 212 can be alternatively referred to as rinsing aspirators. The two exterior hemispherical apertures 212 are separated by (in this case, exterior) gaps 203. In the implementation shown by FIG. 2F, the interior gaps 205 and gaps 203 are perpendicular to each other, providing for a divergent or a transverse aspiration flow and direction of aspiration between the HFC aspirators and the rinsing aspirators.

As seen in both FIGS. 2E and 2F, the exterior hemispherical apertures 212 are arranged on the processing surface and are shaped so as to extend partly around the interior hemispherical apertures 210, and in turn partially around their respective injection aperture 202. Based on this structure, exterior hemispherical apertures 212 can also be referred to as an outer ring and the interior hemispherical apertures 210 can be referred to as a middle ring. An MFP head having such an arrangement of paired and concentric hemispherical apertures, the MFP head will accordingly have additional channels or through-vias (not shown) built into the body of the MFP device to ensure fluid communication with both the exterior hemispherical apertures 212 and the interior hemispherical apertures 210. In some aspects, the exterior hemispherical apertures 212 can be used for improving the confinement of injected fluid under the processing surface, for rinsing purposes, or for both. Improved rinsing over deposited cells can be achieved, for example, by flushing a buffer liquid over deposited cells.

In another implementation applicable to both FIGS. 2E and 2F, interior hemispherical apertures 210 can be controlled liquid apertures. By configuring and selecting appropriate flow rates, the flow and location of processing fluid dispensed through the injection aperture 202 can be controlled with a secondary or shaping fluid (which can be the same fluid as the immersion liquid) injected from the middle ring interior hemispherical apertures 210. The shaping fluid can have a greater density or viscosity than the processing fluid, such that the shaping fluid and processing liquid do not mix, and such that the shaping fluid can act as a fluidic barrier to the processing fluid or other fluids outside of the HFC. Application of the shaping fluid as a fluidic barrier, provided in a continuous supply during operation, can be considered in at least two implementations.

First, the shaping fluid can "pinch" the processing fluid, where the shaping fluid can be dispensed through the middle ring, such that a layer of shaping fluid can be present along the processing surface, but not extend all the way down to a sample surface underneath, allowing for the processing fluid can pass under the shaping fluid, between the bolus of shaping fluid and the underlying sample surface. The shaping fluid can thereby push down, or "pinch", the processing fluid as it flows from the injection aperture to the outer ring aspiration apertures. Accordingly, the shaping fluid can aid better distribution, coverage, and deposition of cells provided through the injected processing fluid onto a sample surface S. The pressure of the shaping fluid need only be sufficient to force the processing fluid down onto the processing surface, so as to ensure that the target material in the processing fluid (e.g., red blood cells, "RBC") does in fact deposit and bind to the processing surface. Both the shaping fluid and processing fluid are then aspirated by the outer ring aspiration apertures. This structure is seen and described in further detail in FIG. 5A below.

Second, the shaping fluid can act as a "shield" against the processing fluid, where the shaping fluid can be dispensed through the outer ring, extending downward to an underlying sample surface. The shaping fluid can thereby act as a barrier and "shield" any processing fluid from escaping from a confined area as the processing fluid flows from the injection aperture to the middle ring aspiration apertures. The shaping fluid can also prevent other fluids from entering the confined area, thus shielding deposited cells from contaminants collected from the ambient environment. This structure is seen and described in further detail in FIG. 5B below.

FIG. 2G shows a seventh variation of an MFP head mesa layout for a processing surface. In particular, injection aperture 202 is positioned in the center of the mesa 200*g*, with a step barrier 214 (alternatively referred to as a "mechanical barrier") positioned around the injection aperture, and with three aspiration apertures 204 further positioned around the step barrier 214 and the injection aperture 202. In mesa 200*g*, the step barrier 214 is a solid element projecting outward from the processing surface of the MFP head, such that the mesa 200*g* has at least two elevations or tiers. The step barrier 214 can be made by being patterned into the apex of the MFP head. The step barrier 214, being positioned between the injection aperture 202 and the aspiration apertures 204 pinches or forces fluid dispensed from the injection apertures to pass underneath the step barrier 214 as the dispensed fluid passes toward the draw of the aspiration apertures 204. Accordingly, the step barrier 214 can aid better distribution, coverage, and deposition of material onto a sample surface S, such as cells, through the fluid dispensed by the injection aperture 202. Further, the three aspiration apertures 204 are in the form of aspiration slits, equal in length, partially surrounding the injection aperture 202, and each equidistant from the injection aperture 202. Each of the three aspiration aperture 204 slits are also spaced equally apart from each other, thereby forming gaps 203 between the aspiration aperture 204 at the same distance from the injection aperture 202. An exemplary mesa 200*g* as shown in FIG. 2G (similar to mesa 200*a* of FIG. 2A) can have, concentrically: a central injection aperture 202 with a radius of about 100 μm; with a step barrier 214 having an interior radius of about 150 μm and an exterior radius of about 225 μm; three aspiration aperture 204 slits, having an interior radius of about 250 μm and an exterior radius of about 300 μm, and three gaps 203 forming a perimeter or circumference around the injection aperture 202.

FIG. 2H shows an eighth variation of an MFP head mesa layout for a processing surface. In particular, injection aperture 202 is positioned in the center of the mesa 200*h*, with a step barrier 214 positioned around the injection aperture 202, and with single aspiration aperture 206 generally forming a circular shape around the injection aperture and step barrier 214. Further, an exterior step barrier 216 is positioned around the single aspiration aperture 206; accordingly, in mesa 200*h* the step barrier 214 can be alternatively referred to as an interior step barrier. In mesa 200*h*, both the interior step barrier 214 and the exterior step barrier 216 are solid elements projecting outward from the processing surface of the MFP head, such that the mesa 200*h* has at least two elevations or tiers. The interior step barrier 214 and the exterior step barrier 216 can both be made by being patterned into the apex of the MFP head. The interior step barrier 214, being positioned between the injection aperture 202 and the single aspiration aperture 206 pinches or forces fluid dispensed from the injection apertures to pass underneath the interior step barrier 214 as the dispensed fluid passes toward the draw of the single aspiration aperture 206. Accordingly, the interior step barrier 214 can aid better distribution, coverage, and deposition of material onto a sample surface S, such as cells, through the fluid dispensed by the injection aperture 202. The single aspiration aperture 206 generally forms a circular shape around the injection aperture, and can span from about 300° to 350° of curvature, with the gap between the two ends of the single aspiration aperture 206 filling the corresponding degrees of curvature.

The exterior step barrier 216 can provide for an additional degree of hydrodynamic flow confinement, blocking fluid that may pass by the single aspiration aperture 206 from escaping the HFC zone of the MFP head and processing surface. In some aspects, the interior step barrier 214 and the exterior step barrier 216 can have equal or similar heights from which they extend from the processing surface of the processing surface. In other aspects, the interior step barrier 214 and the exterior step barrier 216 can have different heights from which they extend from the processing surface of the MFP head. For example, the exterior step barrier 216 can project from the processing surface a greater distance than the interior step barrier 214, and thereby provide for greater HFC due to being close to a sample surface S during operation. An exemplary mesa 200*h* as shown in FIG. 2H can have, concentrically: a central injection aperture 202 with a radius of about 50 μm; with an interior step barrier 214 having an interior radius of about 120 μm and an exterior radius of about 220 μm; a single aspiration aperture 206 having an interior radius of about 300 μm and an exterior radius of about 350 μm; and the exterior step barrier 216 having an interior radius of about 500 μm and an exterior radius of about 800 μm forming a perimeter or circumference around the injection aperture 202. Further, groove 215 is formed by the processing surface between interior step barrier 214 and exterior step barrier 216, where the width and depth of groove 215 can further control flow and stagnation dynamics of fluid injected through the injection aperture 202.

Comparing the mesa 200*h* and the mesa 200*g*, the injection aperture of mesa 200*g* is relatively larger than the injection aperture of mesa 200*h*. It should be generally understood from these embodiments that the size of an injection aperture can be relatively large or small, and that pressure and flow rate through any given injection aperture will be controlled to balance the need for sufficient pressure to ensure binding of material carried by the injected processing fluid with the ability to maintain hydrodynamic flow confinement around the injection aperture. Generally, an injection aperture with a larger diameter will provide for strong and controllable flow amenable to target binding.

FIG. 2I shows a ninth variation of an MFP head mesa layout for a processing surface, similar to FIG. 2H. As in FIG. 2H, mesa 200*i* has an injection aperture 202 is positioned in the center of the mesa 200*a* with an interior step barrier 214 positioned around the injection aperture 202, with a single aspiration aperture 206 generally forming a circular shape around the injection aperture and interior step barrier 214, and with an exterior step barrier 216 is positioned around the single aspiration aperture 206. An exemplary mesa 200*i* as shown in FIG. 2I can have, concentrically: a central injection aperture 202 with a radius of about 125 μm; with an interior step barrier 214 having an interior radius of about 150 μm and an exterior radius of about 250 μm; a single aspiration aperture 206 having an interior radius of about 275 μm and an exterior radius of about 325 μm; and an exterior step barrier 216 having an interior radius of about 350 μm and an exterior radius of about 1000 μm forming a perimeter or circumference around the injection aperture 202. As seen by the exemplary variations, in contrast with FIG. 2H, mesa 200*i* has an injection aperture 202 with a relatively larger diameter. Further, the widths of interior step barrier 214 and exterior step barrier 216, as well as the diameter and curve of single aspiration aperture 206 are different, such that grooves 215 of mesa 200*i* are relatively narrower than the grooves of mesa 200*h*.

FIG. 2J shows a tenth variation of an MFP head mesa layout for a processing surface. In particular, curved mechanical barrier 220 is positioned in the center of the mesa 200*j*, with rectangular injection aperture 218 positioned with bias toward the right side of mesa 200*j*, and with rectangular aspiration aperture 222 positioned with bias toward the left side of mesa 200*j*. In this embodiment, both the rectangular injection aperture 218 and the rectangular aspiration aperture 222 can be referred to as adjacent to the curved mechanical barrier 220. The direction of flow for injected fluid under mesa 200*j* is relatively more unidirectional, as compared to the radial flow toward concentric aspirators shown in other embodiments. An exemplary mesa 200*j* as shown in FIG. 2J can have: a rectangular injection aperture 218 with length and width of 75 μm; a curved mechanical barrier 220 with a proximal edge (relative the rectangular injection aperture 218) 1000 μm from the a central point of the processing surface and a distal edge (again relative the rectangular injection aperture 218) 1200 μm from the central point of the processing surface; and rectangular aspiration aperture 222 with length and width of 75 μm, where the rectangular injection aperture 218 and the rectangular aspiration aperture 222 are about 600 μm distant from each other. It can be appreciated that the injection aperture, aspiration aperture, and mechanical barrier of mesa 200*j* can have other shapes and orientations while still following the arrangement of components and function on the processing surface.

The MFP heads as shown in FIGS. 2G, 2H, 2I, and 2J, having altered mesa geometries, can improve the deposition of cells and/or other material from fluid injected onto the processing surface. The mechanical barriers each have a height of extension from the processing surface of their respective MFP head that narrows the available space under which injected fluid can pass. This both slows down the flow of injected fluid and ensures the formation of a thin lamella, increasing time for contact and surface area for contact of the injected processing liquid, and thus increasing the contact of cells suspending within the processing fluid with the sample surface. It can be appreciated that fluidic barriers positioned between injectors and aspirators can also achieve this function.

FIG. 2K shows an eleventh variation of an MFP head mesa layout for a processing surface. In particular, mesa 200*k* has multiple injection apertures 202 positioned in the centers of osculating circles C, with undulating aspirator 224 passing between and partially surrounding the injection apertures 202. In some aspects, the arrangement of mesa 200*k* can be referred to as a linear arrangement of the injection apertures 202. The wavy or snaking shape of undulating aspirator 224 actually provides for advantages in multiplexed testing implementations, because each of the injection apertures 202 are isolated from each other, and thus different processing fluids can be deposited by the injection apertures in close physical proximity, but without the traditional risk of cross-contamination due to the undulating aspirator 224 between the injectors. In some implementations, each of the three injection apertures 202 are independent, with distinct pumping systems and reservoirs. In such aspects, all three injection apertures 202 can inject different reagents, solutions, or other such fluids. In other implementations, two of the injection apertures 202 (e.g., the two side injection apertures) can share a fluidic connection and inject the same solution, driven with a single pumping system.

The average diameter of the osculating circles C lines up with a proximal edge of an undulating aspirator 224, and in some aspects the diameter is between 150 μm and 1000 μm. In the example of FIG. 2K, the processing surface 26 includes several aligned injection apertures 202 aligned, with the undulating aspirator 224 slit extending partly around each of the injection apertures 202. The osculating circles C are explicitly depicted in FIG. 2K in order to better illustrate their tangent to a proximal edge of the undulating aspirator 224; which is the edge portion of the aspiration slit that is the closest to the centroid of a respective injection aperture on the processing surface. Alternatively, the arrangement of mesa 200*k* can provide for particular advantages with MFP heads for horizontal scanning applications.

FIG. 2L shows a twelfth variation of an MFP head mesa layout for a processing surface. In particular, similar to FIG. 2A, injection aperture 202 is positioned in the center of the mesa 200*l* with three aspiration apertures 204 positioned around the injection aperture 202. In mesa 200*l* the three aspiration apertures 204 are in the form of aspiration slits, equal in length, partially surrounding the injection aperture 202, and each equidistant from the injection aperture 202. Each of the three aspiration aperture 204 slits are also spaced equally apart from each other, thereby forming gaps 203 between the aspiration apertures 204 at the same distance from the injection aperture 202. Further, injection ring apertures 226 are positioned around the aspiration apertures 204, where the circle along which injection ring apertures 226 are patterned also have external gaps 207. The arrangement of aspiration apertures 204 and injection ring apertures 226 are offset from each other by about 60° of rotation. In this embodiment, the injection ring apertures 226 deposit the sample fluid having cells, where that sample fluid is then drawn toward the aspiration apertures 204, inward toward the center of the mesa 200*l*.

The structure and configuration of FIG. 2L allows for at least two modes of operation. The first mode is for cell deposition, where buffer solution is injected through injection aperture 202 and where sample fluid with cells is injected through injection ring apertures 226. In this first mode, fluid is being concurrently pulled inward (the sample from the injection ring apertures 226) and outward (the buffer from injection aperture 202) toward the aspiration apertures. This mode allows for precise control of cell disposition due to the defined ring-shaped deposition zone between the buffer and stagnation zones surrounding the injection ring apertures 226. In the second mode, a rinsing fluid is injected from the injection ring apertures 226 and the injection aperture 202 is not used or turned off. This allows for immersion fluid to be pulled in from the sides of the MFP head, without any counteracting force within the stagnation zone of the application.

FIG. 2M shows a thirteenth variation of an MFP head mesa layout for a processing surface. In particular, injection aperture 202 is positioned at the center of a mesa 200*m*, and has four rectangular aspiration apertures 222 arranged crosswise with the injection aperture centered between the four rectangular aspiration apertures 222. The four rectangular aspiration apertures 222 can provide for a straightforward and strong flow, pulling from the single injection aperture 202.

FIG. 2N shows a fourteenth variation of an MFP head mesa layout for a processing surface. In particular, injection aperture 202 is positioned in the center of the mesa 200*n* with three aspiration apertures 204 positioned around the injection aperture, similar to FIG. 2A. In mesa 200*n*, there is a further set of radial step barriers 228 extending as arms outward from an interior step barrier 214. The radial step barriers 228 are protruding structures that are laterally structured to have arms or portions that extend through gaps between the aspiration slits 204, to help avoid inefficient rinsing between the aspiration apertures. Indeed, as the flow of immersion liquid can to be slower in the gaps between aspiration apertures, rinsing of the processed area is less effective in those regions. Thus, local protruding structures such as the radial step barriers 228 help increase the flow through the gaps and therefore contribute to improve rinsing during scanning. Such lateral portions also further allow better guidance of the radial flow of immersion liquid. In such embodiments, rinsing can take place during the cell deposition process or after the process, with the rinsing fluid guided by the radial step barriers 228 to adequate and desired locations.

An exemplary mesa 200*n* as shown in FIG. 2N can have: an injection aperture with a radius of about 100 μm, an interior step barrier 214 having an interior radius of about 150 μm and an exterior radius of about 225 μm, radial step barriers 228 extending from the interior step barrier 214 and having an distal edge radius of about 500 μm, and three aspiration aperture 204 slits, having an interior radius of about 250 μm and an exterior radius of about 300 μm.

FIG. 2O shows a fifteenth variation of an MFP head mesa layout for a processing surface. In particular, injection aperture 202 is positioned in the center of the mesa 200*o* with three aspiration apertures 204 positioned around the injection aperture. Beyond the edge of mesa 200*o*, but still proximate to the perimeter of mesa 200*o*, there are further included edge aspirators 230 positioned to be at the "front edge" and "back edge" along the direction the MFP head is used to scan across a sample surface. The additional aspiration can aid in overall performance of the system, maintaining the HFC and removing excess buffer or immersion fluid. Alternatively, the front edge and trailing edge aspirators 230 can be used for buffer dispersion. Further, it can be understood that other mesa layouts as disclosed herein can be used in combination with the edge aspirators 230 shown in FIG. 2O. Moreover, it can be understood that in alternative embodiments, edge aspirators 230 can also be positioned at "left edge", "right edge", or diagonal positions around the mesa 200*o*. An exemplary mesa 200*o* as shown in FIG. 2O can have edge aspirators 230 generally curved to track along the path of a circle around the injection aperture 202, where the edge aspirators 230 have a proximate edge radius of about 1200 μm and a distal edge radius of about 1250 μm.

From FIGS. 2A-2O, it can be understood that injection apertures, aspiration apertures, mechanical barriers, and other mesa structures can have various sizes and shapes, which can be selected for particular applications as appropriate. The exemplary distances and sizes articulated above should not be considered to be limiting. Further, each of the injection apertures can be configured to deposit fluids at a particular rate of flow, ranging from one-half microliter per minute (0.5 μL/min) to eighty microliters per minute (80 μL/min), and at specific increments, gradients, and ranges therein. In specific embodiments, injection apertures can deposit fluids with a rate of flow of about two microliters per minute (2 μL/min), a rate of flow of about three microliters per minute (3 μL/min), or a rate of flow of about five microliters per minute (5 μL/min). Similarly, each of the aspiration can be configured to vacuum fluids at a particular rate of draw, ranging from one microliter per minute (1 μL/min) to eighty microliters per minute (80 μL/min), and at specific increments, gradients, and ranges therein. In specific embodiments, injection apertures can deposit fluids with a rate of flow of about ten microliters per minute (10 μL/min), a rate of flow of about fifteen microliters per minute (15 μL/min), or a rate of flow of about twenty microliters per minute (20 μL/min).

It can be appreciated that MFP heads as shown in FIGS. 2A, 2C, 2D, 2E, 2F, 2G, 2L, 2M, 2N, and 2O all have a symmetry of flow, to varying degrees, based on the arrangement of their aspiration apertures relative to their injection aperture(s). Such symmetry of flow can be leveraged to better maintain HFC underneath such mesa layouts. Conversely, it can be appreciated that MFP heads as shown in FIGS. 2B, 2H, 2I, 2J, and 2K all have a directed or partially asymmetric flow, to varying degrees, based on the arrangement of their aspiration apertures relative to their injection aperture(s). Such directional control can be leveraged for applications where additional fluid flow control is needed within an HFC region.

Figure 3A:
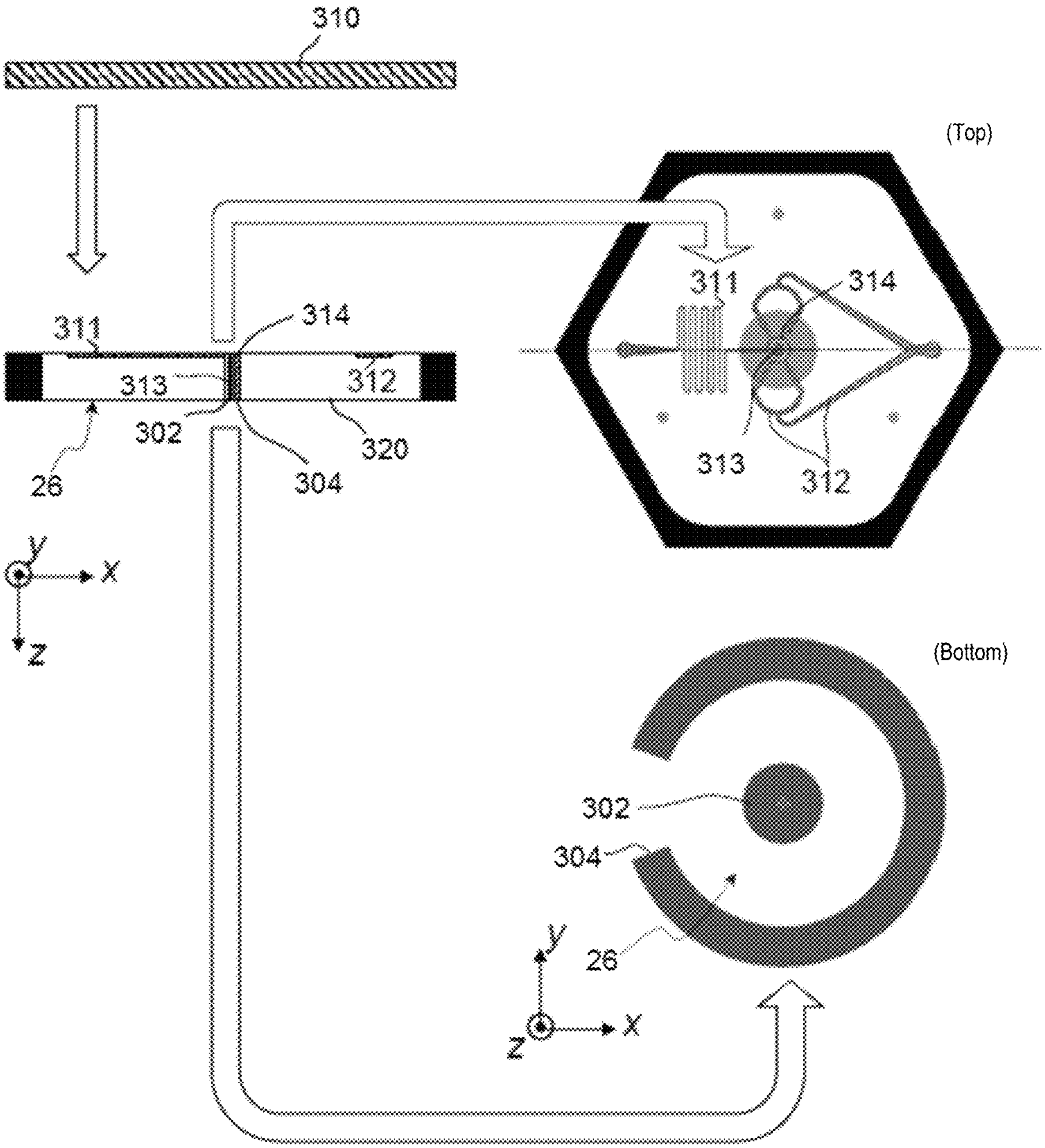
FIG. 3A depicts a cross-sectional view of a pair of stacked layers, as used to fabricate an MFP head according to embodiments of the present disclosure.
Figure 3B:
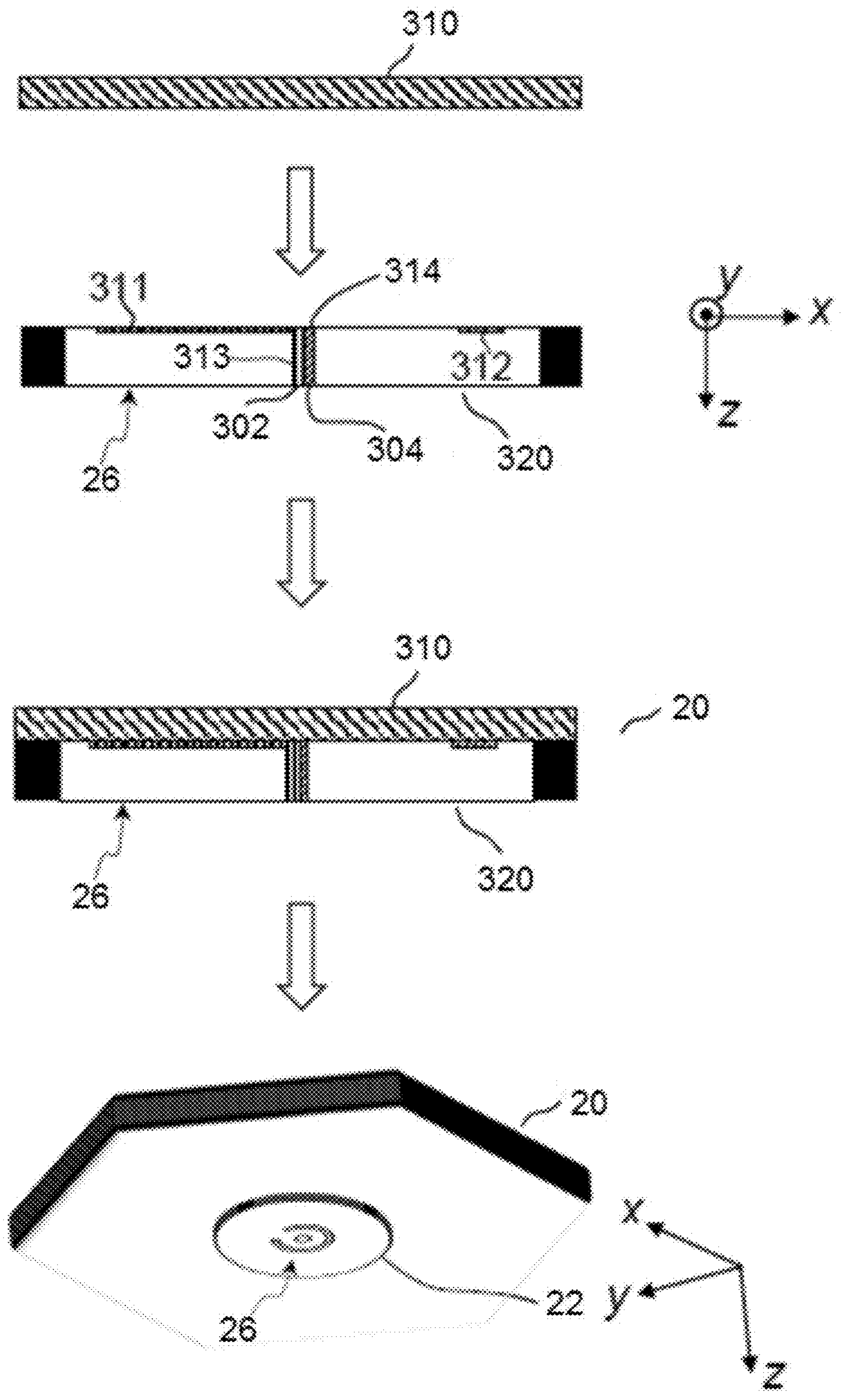
FIG. 3B illustrates the assembly of the two layers of FIG. 3A.

FIG. 3A depicts a cross-sectional view of a pair of stacked layers 300, as used to fabricate an MFP head. These layers include a capping layer 310 and a liquid routing layer 320, with corresponding views of opposite sides of the liquid routing layer are shown. FIG. 3B illustrates the assembly of the two layers of FIG. 3A. Fabrication of embodiments of an MFP head 20 includes (at least) these two layers. In some embodiments, the capping layer 310 can be made of, for example, glass, and the a liquid routing layer 320 can be made of, for example, silicon. The bottom face of the capping layer 310 covers the top face of the liquid routing layer 320, parallel to a horizontal plane (x, y). The processing surface 26 is defined by the bottom face of the liquid routing layer 320, which is opposite to the top face thereof.

The liquid routing layer 320 includes a liquid injection aperture 302 and a liquid aspiration aperture 304, each defined on the bottom face of the liquid routing layer 320. Located on the top surface of the liquid routing layer 320 are a liquid injection channel 311 and a liquid aspiration channel 312, each in fluid communication with the injection aperture 302 and the aspiration slit 304. The injection aperture 302 can be in fluid communication with the liquid injection channel 311 through an injection via 313 that passes through the body of the liquid routing layer 320. The aspiration aperture 304 can be in fluid communication with the liquid aspiration channel 312 through an aspiration via 314 that also passes through the body of the liquid routing layer 320. In other embodiments, more channels and vias may be involved, leading to other apertures, with two or more vias leading from respective channels to the same aperture, with two or more vias connecting respective apertures to the same channel, or combinations thereof. In the example of FIG. 3A, the aspiration channel 312 particularly includes hierarchically subdividing channels, which irrigate the through aspiration via 314. The capping 310 layer closes the channels, formed as grooves on top of the liquid routing layer 320.

Generally, the vias 313, 314 extend as through-holes through a thickness of the liquid routing layer 320, as depicted in FIGS. 3A and 3B. The vias 313, 314 may need be shaped correspondingly with the design and location of the apertures in mesa 22. For example, in embodiments of an MFP head where the apertures are concentric, the volume of the aspiration via 314 corresponds to a partial cylinder shell, having a main axis that coincides with the main axis of the injection via 313 cylinder hole. The head may comprise additional through-vias (not shown) to ensure fluid communication to additional apertures if necessary, as seen in various embodiments of the MFP heads disclosed herein.

The liquid routing layer 320 can be etched on the bottom face, for example to create the relevant apertures, and also etched on the top face, for example to create the relevant fluidic routing channels. The liquid routing layer 320 and capping layer 310 layers can assembled and bonded to form an MFP head 20, as depicted in FIG. 3B.

In variants, three-layer configurations for an MFP head may be contemplated, with the channels grooved on the bottom face of a layer sandwiched between a capping layer and a third layer, which would comprise the apertures and through holes to ensure fluid communication.

Figure 3C:
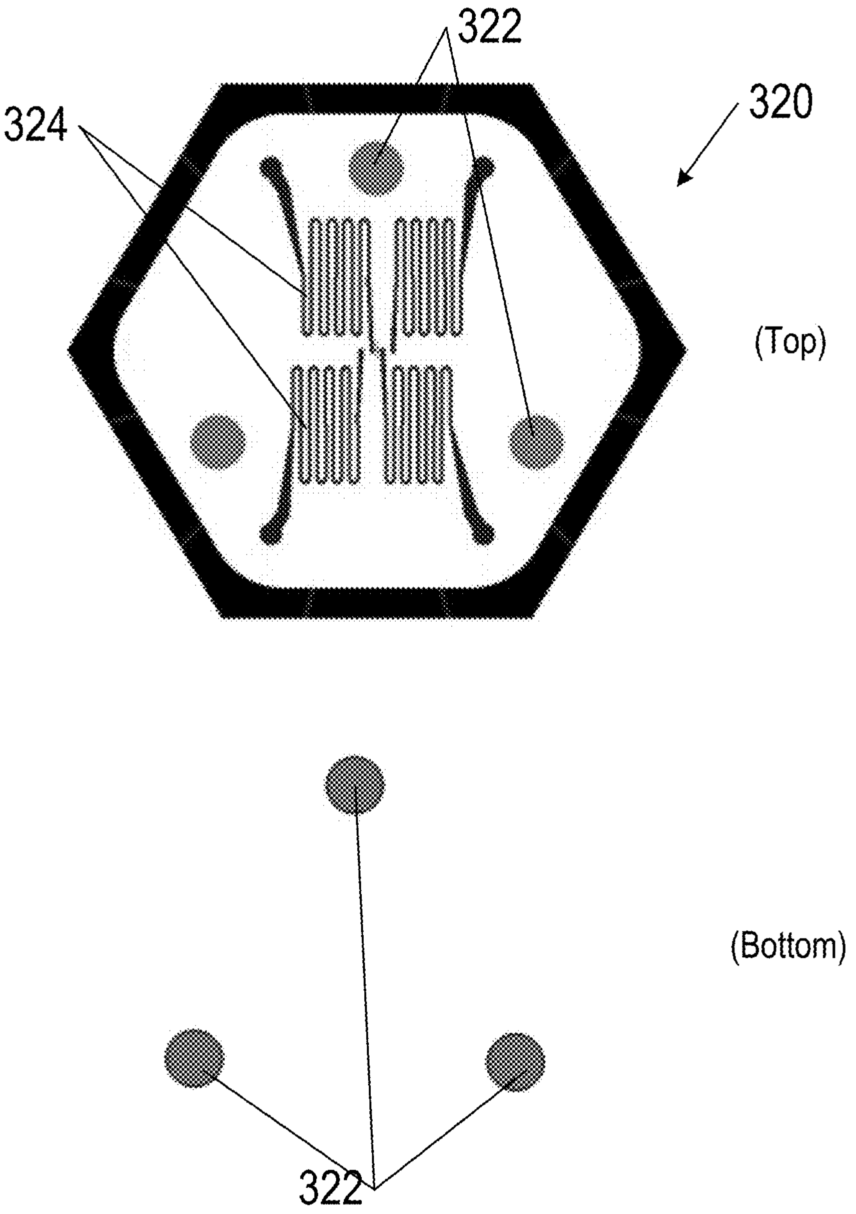
FIG. 3C illustrates an alternative layout for a liquid routing later layer, according to various embodiments of the present disclosure.

FIG. 3C illustrates an alternative embodiment of a top layer and a bottom of a liquid routing layer 320, having a triangular arrangement of three apertures 322, and with a set of four liquid channels 324 configured to direct or receive fluids from the apertures 322, for injection or aspiration as needed. It can be understood that further variations of the liquid routing layer 320 with different numbers of apertures

322 and liquid channels 324, can be formed from these elements, as appropriate for a desired MFP head 20 and mesa 22 structure.

The microchannel and aperture arrangements within the MFP head as shown in FIG. 3C provide a structure that can be efficiently used for sequential chemistry processes. Each of the three apertures 322 can be connected to different fluid sources, thereby allowing for the alternating or sequential injection of sample fluid, reagents, buffer, washing fluid, and the like. The sequence of injected fluids through the separate apertures 322 can be set according to any given experimental design. An advantage in the use of the separate apertures 322 is that, with apertures (and corresponding fluid supply channels) dedicated to depositing a single fluid at a time, the amount of residual solution or sample carried from one injection process into a subsequent injection process is significantly reduced, and potentially eliminated.

Configurations of MFP heads as shown in FIGS. 2C and 2K above can also be used for sequential chemistry processes, taking advantage of the two or more injection apertures of those MFP heads. It should be understood that further variations of MFP heads can use any number of injection apertures for sequential chemistry, within the structural limitations of the size of the related mesa and the number of fluid supply channels that can be fit in the overall probe body. In some implementations, individual fluid supply channels or injection apertures can be used by more than one injection aperture, with only minimal concern for carry-over of solution or particles from one step of a sequential process to the next. For example, the same channel or injection aperture could be used sequentially for a rinse and then for an anti-globulin injection.

Figure 4A:
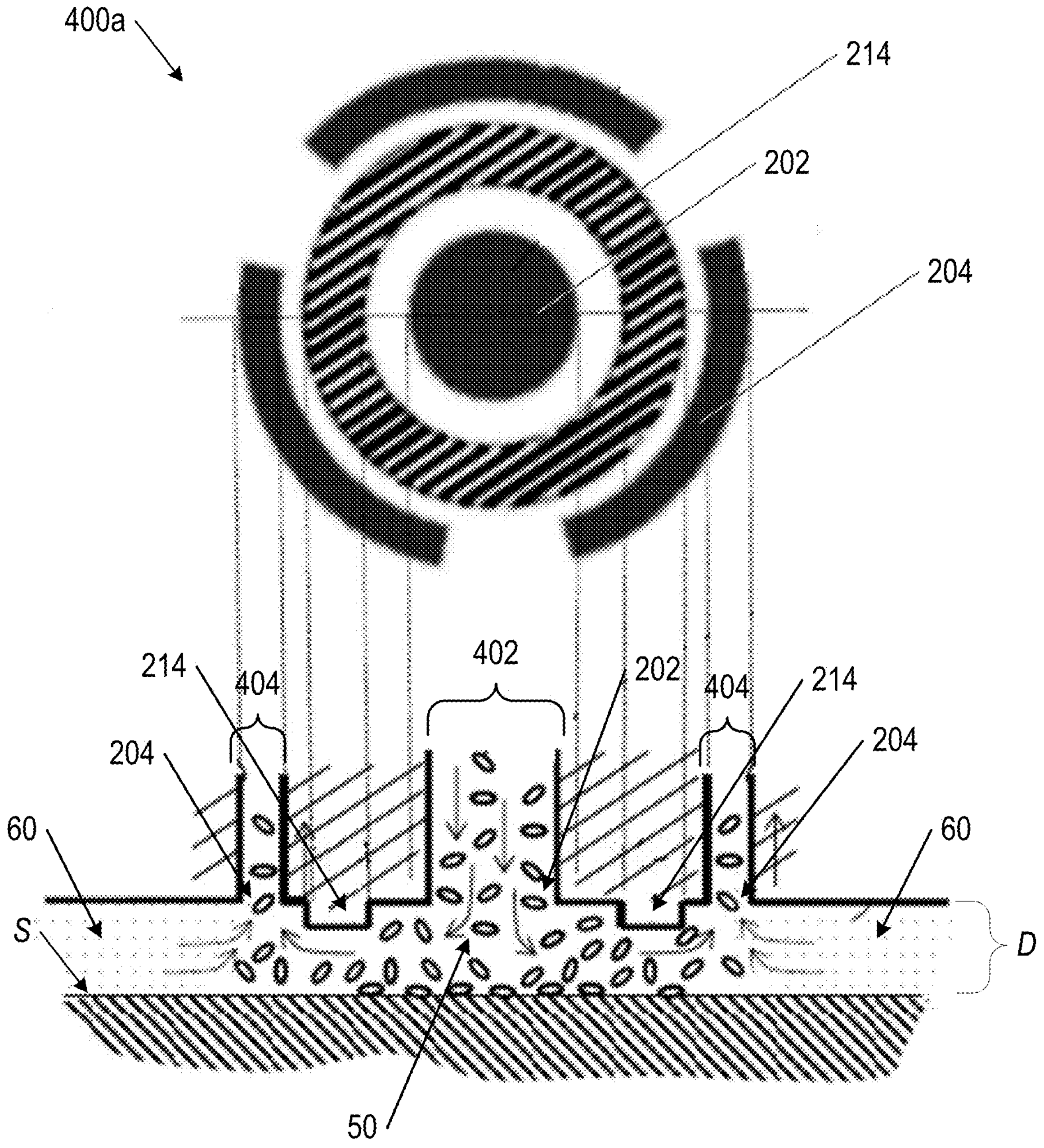
FIG. 4A shows a plan view and cross-sectional view of apertures and a protruding mechanical barrier section formed in a processing surface of an MFP head similar to the MFP head shown in FIG. 2G, with corresponding illustration of cell deposition and fluid flow, according to various embodiments of the present disclosure.

FIG. 4A shows a plan view and a cross-sectional magnified view of apertures and a protruding section formed in a processing surface of an MFP head, similar to the MFP head shown in FIG. 2G, with corresponding fluid flow.

As seen in FIG. 4A, a MFP head and processing surface 400*a* is positioned in proximity with a sample surface S, where the sample surface S is immersed under an immersion liquid 60. Thus, the MFP head and processing surface 400*a* is immersed in the immersion liquid 60. The flow of injection liquid 50, which can be a non-Newtonian fluid and/or include cells, is routed by an injection microchannel 402 through injection aperture 202 downward toward the sample surface S. A circular step barrier 214 surrounds the injection aperture 202, partially interrupting, slowing, and redirecting downward the flow of injection liquid 50 out of injection aperture 202. Further, the injection fluid 50 is drawn outward in a radial direction toward liquid aspiration apertures 204, where the draw of the aspiration also flattens out the injection fluid 50 lamella over the sample surface S. Accordingly, cells in the injection liquid 50 are pushed and/or pinched downward into contact with the sample surface S where specific bindings, chemistries, and reactions can take place. Both the immersion liquid 60 and the injected liquid 50 can be aspirated from the processing surface and sample surface S area through liquid aspiration apertures 204. The mixed liquid volume (which can also include other fluids such as buffers) are routed through one or more aspiration microchannels 404 away from the MFP head, and ultimately to a waste receptacle. Variations of the step barrier 214 as intermediate protruding structure from the processing surface of the MFP head can be present, as described above.

Figure 4B:
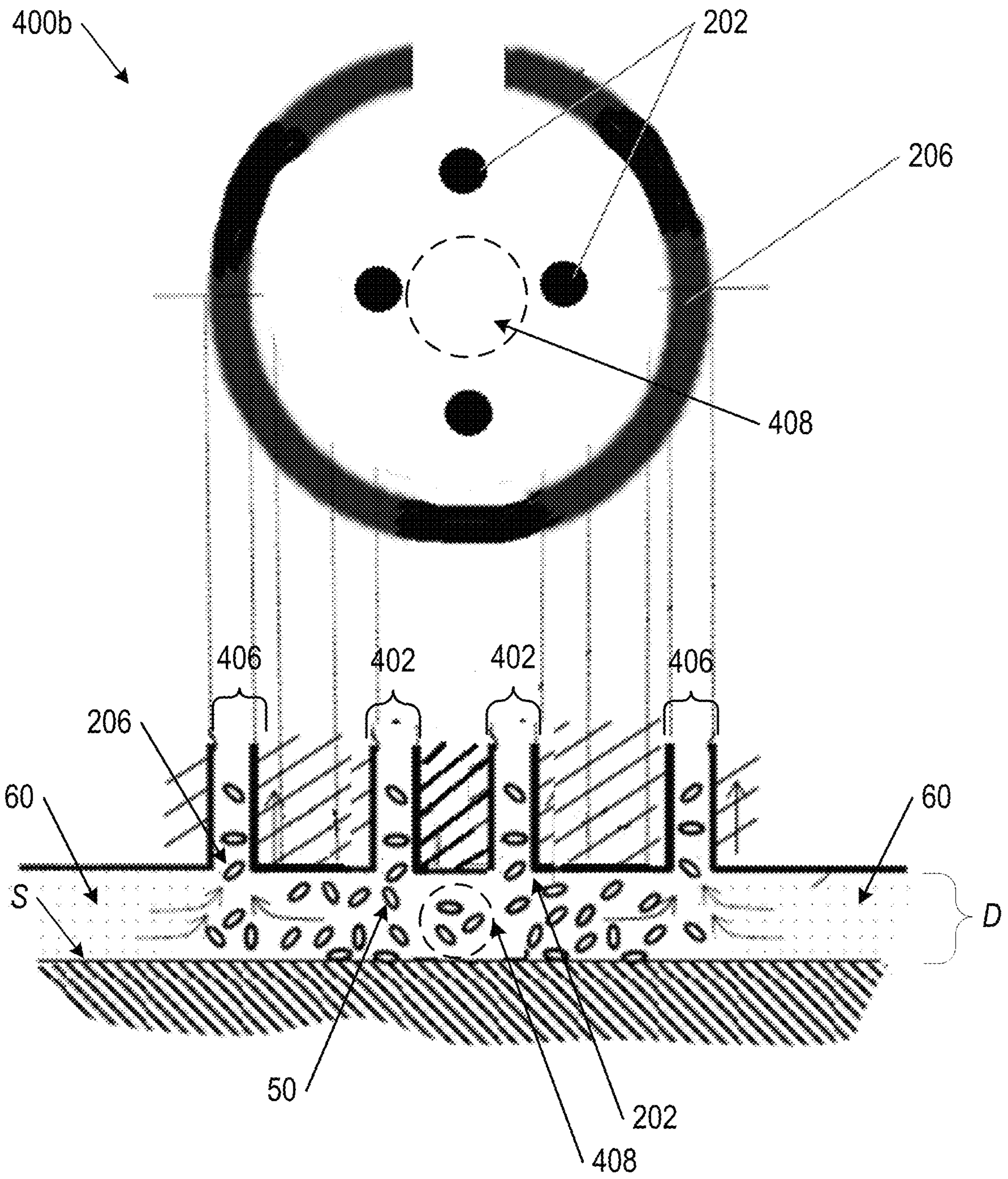
FIG. 4B shows a plan view and cross-sectional view of apertures formed in a processing surface of an MFP head similar to the MFP head shown in FIG. 2C, with corresponding illustration of cell deposition and fluid flow, according to various embodiments of the present disclosure.

FIG. 4B shows a plan view and cross-sectional and magnified view of apertures in a processing surface of an MFP head, similar to the MFP head shown in FIG. 2C, with corresponding fluid flow.

As seen in FIG. 4B, a MFP head and processing surface 400*b* is positioned in proximity with a sample surface S, where the sample surface S is immersed under an immersion liquid 60. Thus, the MFP head and processing surface 400*b* is immersed in the immersion liquid 60. The flow of injection liquid 50, which can be a non-Newtonian fluid and/or include cells, is routed by injection microchannels 402 through injection apertures 202 downward toward the sample surface S. Accordingly, cells in the injection liquid 50 are pushed directed downward into contact with the sample surface S where specific bindings, chemistries, and reactions can take place. Further, the injection fluid 50 is drawn outward in a radial direction toward a single liquid aspiration aperture 206, where the draw of the aspiration flattens out the injection fluid 50 lamella over the sample surface S. Both the immersion liquid 60 and the injected liquid 50 can be aspirated from the processing surface and sample surface S area through the single liquid aspiration aperture 206. The mixed liquid volume (which can also include other fluids such as buffers) are routed through a single, ring-like aspiration microchannel 406 away from the MFP head, and ultimately to a waste receptacle.

The embodiment of FIG. 4B with four injection apertures 202 provides for a stagnation zone 408 in between the injection aperture 202. Within the stagnation region 408, injection liquid 50 can have a greater residence time and/or exposure due to the flow dynamics surrounding the stagnation region, and thereby increase the degree of binding or reaction between cells in the injection liquid 50 and the sample surface S.

In further alternative embodiments, as can be inferred from the mesa geometries of the MFP heads considered above, liquid can be injected or aspirated by additional apertures surrounding the first aspiration apertures to improve confinement or for rinsing purposes. Indeed, in some applications, it is important to remove non-specifically bound cells and also cells that remain on the surface due to sedimentation.

Rinsing can take place either during the deposition process (continuous rinsing) or after the process (sequential rinsing). In support of that functionality, additional aspiration apertures can allow for a “high rinsing” zone to be created. With such an arrangement loosely bound cells in an injection liquid 50 are aspirated through the inner aspiration apertures, without being disturbed by the rinsing liquid (e.g., the immersion liquid) aspirated via the additional aspiration apertures.

Figure 5A:
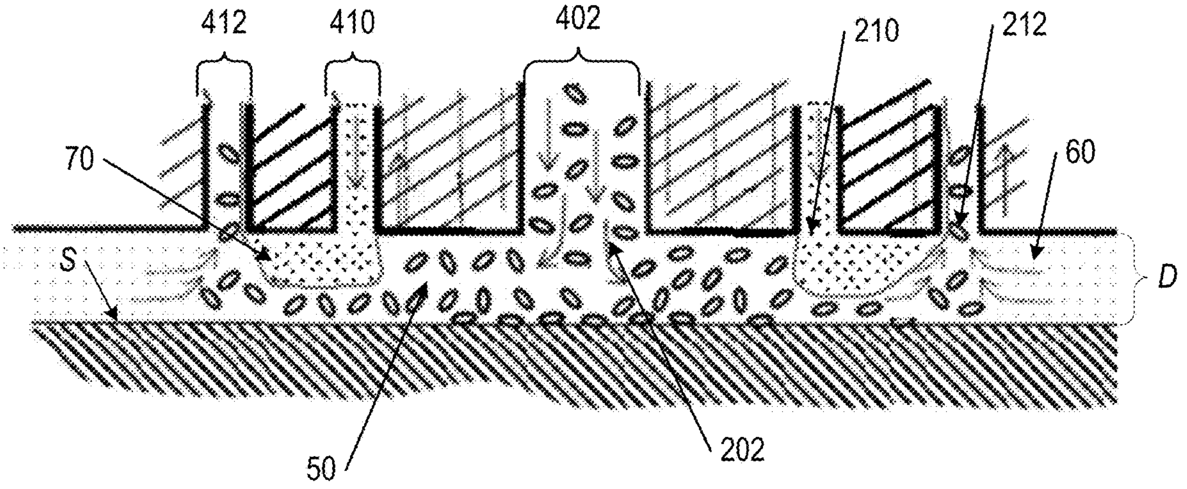
FIG. 5A shows cross-sectional view of apertures formed in a processing surface of an MFP head, illustrating cell deposition and aspirator draw proximate to a fluidic barrier, according to various embodiments of the present disclosure.
Figure 5B:
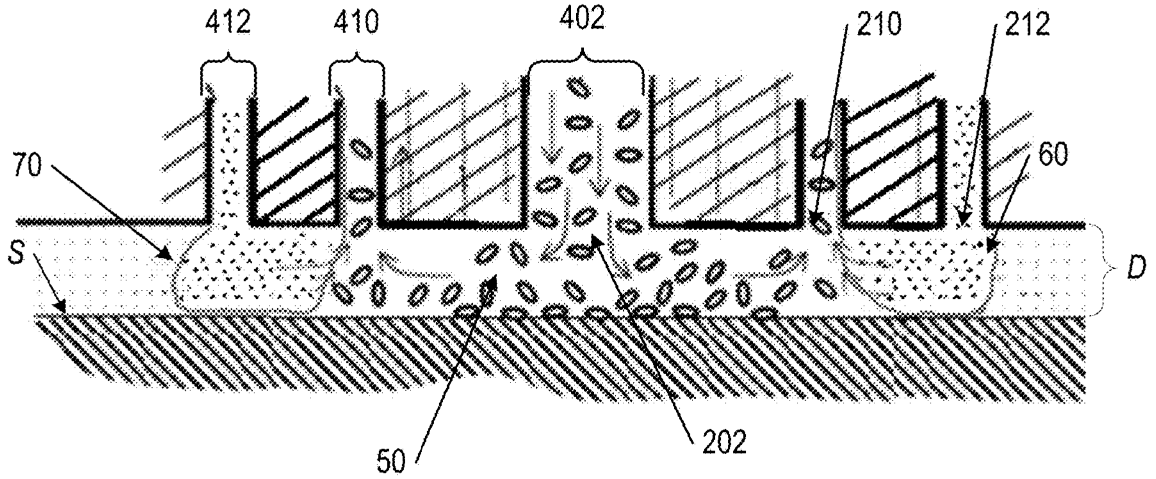
FIG. 5B shows a cross-sectional view of apertures formed in a processing surface of an MFP head, illustrating cell deposition and aspirator draw proximate to a fluidic barrier, according to various embodiments of the present disclosure.

In some embodiments, as noted above, some apertures can be used to inject a secondary liquid, alternatively referred to as a shaping fluid, that functions as a fluidic barrier. Such injection apertures are typically in fluid communication with corresponding microchannels as depicted in FIGS. 5A and 5B, which for the exemplary embodiments shown, correspond to the MFP heads and mesa geometry of FIGS. 2E and 2F, respectively. The microchannels for the injection of two fluids, such as the processing liquid and the secondary liquid, can be connected to distinct pumping means or shared pumping means. In particular, interior ring microchannel 410 and exterior ring microchannel 412 can have shared or distinct pumping mechanisms to control flow through the interior hemispherical apertures 210 or exterior hemispherical apertures 212, respectively. Further, interior ring microchannel 410 and exterior ring microchannel 412 can have linked or distinct fluidic connections to liquid reservoirs for the injection and removal of liquids. As seen, both the processing liquid 50 and the secondary liquid are dispensed (i.e., injected) through their respective injection apertures and aspirated through the aspiration apertures. Application of the shaping fluid 70 as a fluidic barrier, provided in a continuous supply during operation, proximate to the injection of the processing liquid 50, can be considered in at least two implementations.

In both FIGS. 5A and 5B, fluidic barriers can be routed through either interior hemispherical apertures 210 or exterior hemispherical apertures 212, respectively, and having such function these apertures can be referred to as controlled liquid apertures. By configuring and selecting appropriate flow rates, the flow, volume, and location of shaping fluid 70 dispensed through either the interior hemispherical apertures 210 or exterior hemispherical apertures 212, can be controlled relative to the processing surface of the MFP head. In some aspects, the shaping fluid 70 can be the same fluid as the immersion liquid 60. In some applications, the shaping fluid 70 can have a greater density or viscosity than the processing liquid 50, such that the shaping fluid 70 and processing liquid 50 do not mix, and such that the shaping fluid 70 can act as a fluidic barrier to the processing liquid 50. In other applications, the shaping fluid 70 can have a density equal to or less than the processing liquid 50, and/or a viscosity equal to or less than the processing liquid 50. In further aspects, the shaping fluid 70 and processing liquid 50 can be injected at different fluid flow pressures, where the shaping fluid 70 is injected at a relatively higher pressure than the processing liquid.

FIG. 5A illustrates the shaping fluid 70 pinching the processing fluid 50, where the shaping fluid 70 is dispensed through a middle ring apertures 210, such that a layer of shaping fluid 70 is present along the processing surface, but does not extend all the way down to a sample surface S. The controlled volume and flow of the shaping fluid 70 emerging from the MFP head allows for the processing liquid 50 to pass under the shaping fluid 70, between the bolus of shaping fluid 70 and the underlying sample surface S. The shaping fluid 70 thereby pushes down on the processing liquid 50 as the processing liquid 50 flows from the injection aperture 202 to the outer ring aspiration apertures 212. The shaping fluid 70 can also slow down or redirect the flow of the processing liquid coming out of the injection aperture 202, thus increasing the residence time during which processing liquid 50 is held within a desired HFC zone. Accordingly, the shaping fluid 70 can aid in the better distribution, coverage, and deposition of cells provided through the injected processing liquid 50 onto the sample surface S. Both the shaping fluid 70 and processing liquid 50 are aspirated by the outer ring aspiration apertures 212.

FIG. 5B illustrates the shaping fluid 70 shielding the processing liquid 50 and the immersion liquid 60 from each other. The shaping fluid 70 is dispensed through the outer ring apertures 212, extending downward to an underlying sample surface S. The shaping fluid 70 can thereby act as a barrier and shield any processing liquid 50 from escaping from the desired confinement area as the processing liquid 50 flows from the injection aperture 202 to the middle ring aspiration apertures 210. Further, the fluidic barrier formed by the shaping fluid 70 can increase the residence time during which processing liquid 50 is held within a desired HFC zone, and thus improve the distribution, coverage, and deposition of cells provided through the injected processing liquid 50 onto the sample surface S. Of note, as compared to the implementation shown in FIG. 5A, in FIG. 5B the outer ring functions as an injection aperture, not an aspiration aperture, and the middle ring aperture functions as an aspiration aperture, not a secondary fluid injection aperture. The shaping fluid 70 can also prevent other fluids (e.g., immersion liquid 60) from entering the desired fluid confinement area, thus shielding deposited cells from potential contaminants in the ambient environment.

While FIGS. 5A and 5B show implementation of the fluidic barrier using the hemispherical aperture format as seen in FIGS. 2E and 2F, respectively, but it should be understood that any accommodating sets of apertures can be used to inject processing fluid and shaping fluid, and aspirate both fluids.

Figure 6A:
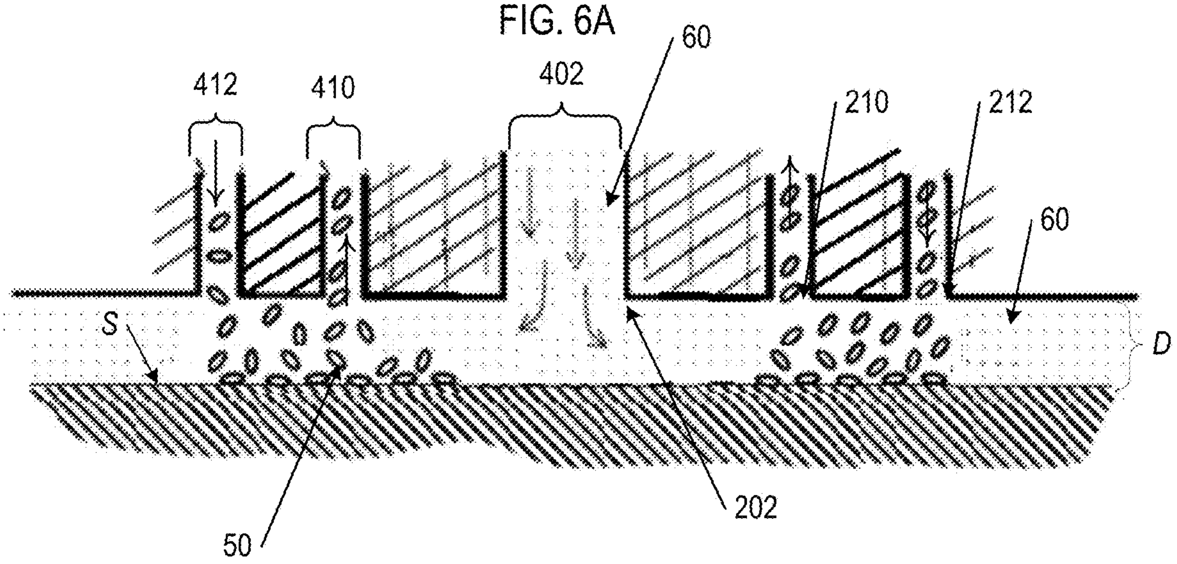
FIG. 6A shows a cross-sectional view of apertures formed in a processing surface of an MFP head, illustrating rinsing and aspirator draw, according to various embodiments of the present disclosure.
Figure 6B:
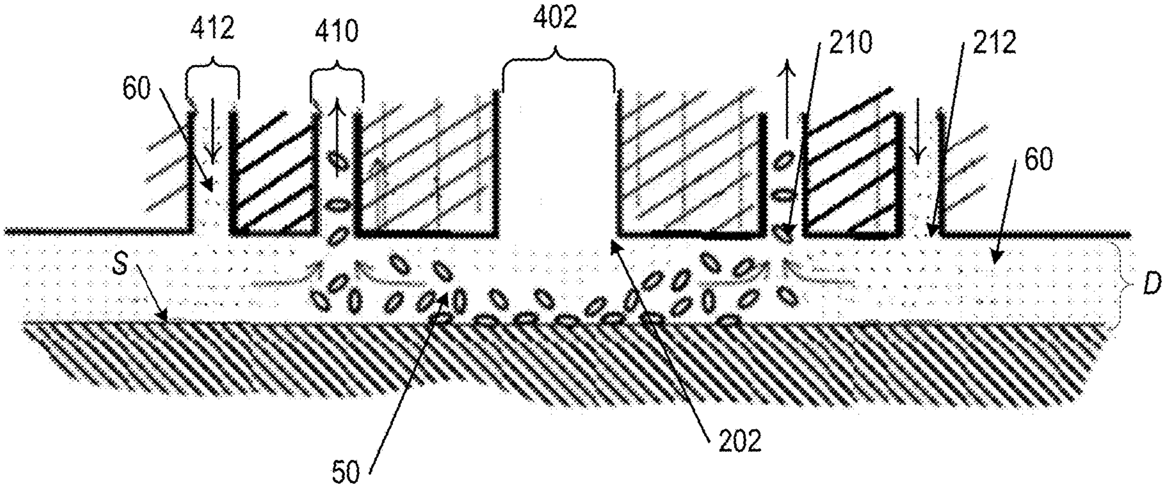
FIG. 6B shows a cross-sectional view of apertures formed in a processing surface of an MFP head, illustrating rinsing and aspirator draw, according to various embodiments of the present disclosure.

In other embodiments, an MFP head with two tiers of apertures at different distances from the center of the processing surface can be operated a rinsing mode, dispensing buffer, immersion liquid, or other such rinsing fluids. FIG. 6A shows a first mode to ensure efficient cell deposition, where the flow direction of cells is from the outer apertures 212 to the inner apertures 210 aspirating the fluids. The buffer liquid (e.g., the immersion liquid 60) is injected via the central injection aperture 202. FIG. 6B shows a second mode, with the injection of buffer liquid from the central injection aperture stopped, and with buffer liquid instead injected through outer apertures 212 and aspirating through inner apertures 210. In alternative embodiments, either or both of inner apertures 210 and outer apertures 212 can be individual holes, rings, or the like. This can provide for efficient rinsing of the deposited cells that do not bind or react with the underlying sample surface S.

It can be appreciated from FIGS. 4A though 6B that the distance between a processing surface and an underlying sample surface S is an important variable to control in order to maintain HFC within the desired region during operation of the MFP head. This distance between the processing surface and the sample surface S can be referred to as a working distance D. In various aspects, the working distance D can be a predetermined height above the sample surface S, where the working distance D can be set according to the height of supporting posts extending from the processing surface. In other aspects, the working distance D can be set according to a calculated height to which the microfluidic probe head descends within a sample well, where the calculated height can be a proportion or ratio between the size or diameter of the sample well, the size or area of a target region on a sample surface or substrate, the size or diameter of the processing surface, the size or diameter of injection apertures in the processing surface, the size or diameter of aspiration apertures in the processing surface, the location of injection and aspiration apertures along the processing surface, or a combination thereof. In many applications as considered herein, the working distance D can be about 100 μm. In some applications, the working distance D can be about 90 μm±20 μm. In other implementations, the working distance D can be from 50 μm to 300 μm, and can be at any increment, gradient, or range therein.

MFP Head Testing for Homogeneous RBC Deposition

A further aspect of the disclosure concerns methods of operating an MFP head 100 or an MFP device as described above, understood in reference to FIGS. 7, 8, 9, and 10. Aspects of these methods can be further understood and inferred from reference to FIGS. 1 through 6B above. Basically, such methods first require to position the MFP head 100 in proximity with a sample surface S to be processed, so as for the processing surface 26 to face the sample surface S. The sample surface S is typically immersed in an immersion liquid. Then, processing liquid can be injected via liquid injection aperture(s), while aspirating liquid from the aspiration apertures (e.g. slits, rings, etc.), to process the sample surface S. As noted earlier, the steps of injecting the processing liquid and aspirating liquid may be performed so as to maintain a hydrodynamic flow confinement of injected liquid between the injection aperture(s) and the aspiration aperture(s).

To test the performance of a MFP head having a mechanical barrier between the center injection aperture and the part surrounding aspiration aperture, fluidic tests using food colorant as injection liquid were performed (using a pressure driven pumping system, Fluigent, France). The MFP head was placed over a glass slide at distances varying from thirty to two hundred micrometers (30-200 μm) and an aqueous food color solution injected at about five microliters per minute (5 μL/min). The desired deposition with HFC was achieved. Injection in the a range between 0.5 and twenty microliters per minute (0.5-20 μL/min) also worked well. Aspiration was performed simultaneously with a two-fold to three-fold higher flow rate than the injection. The immersion liquid used in this test was water.

To generate patterns of cells on a surface, a MFP head with a center injection aperture and surrounding aspiration aperture, but without a barrier, was used. The injection liquid comprised human red blood cells (Type A, 50% concentration) and the surface of the substrate (a polystyrene slide) was pre-coated with an appropriate antibody to capture the red blood cells from the flow. Flow rates were in the region of: injection at five microliters per minute (5 μL/min); aspiration at twenty microliters per minute (20 μL/min). The desired deposition with HFC was achieved, with the red blood cells immediately binding upon contact with the antibody on the substrate. Higher flow rates or lower flow rates for either injection or aspiration also worked. The immersion liquid used in this test was physiological salt solution.

Figure 7:
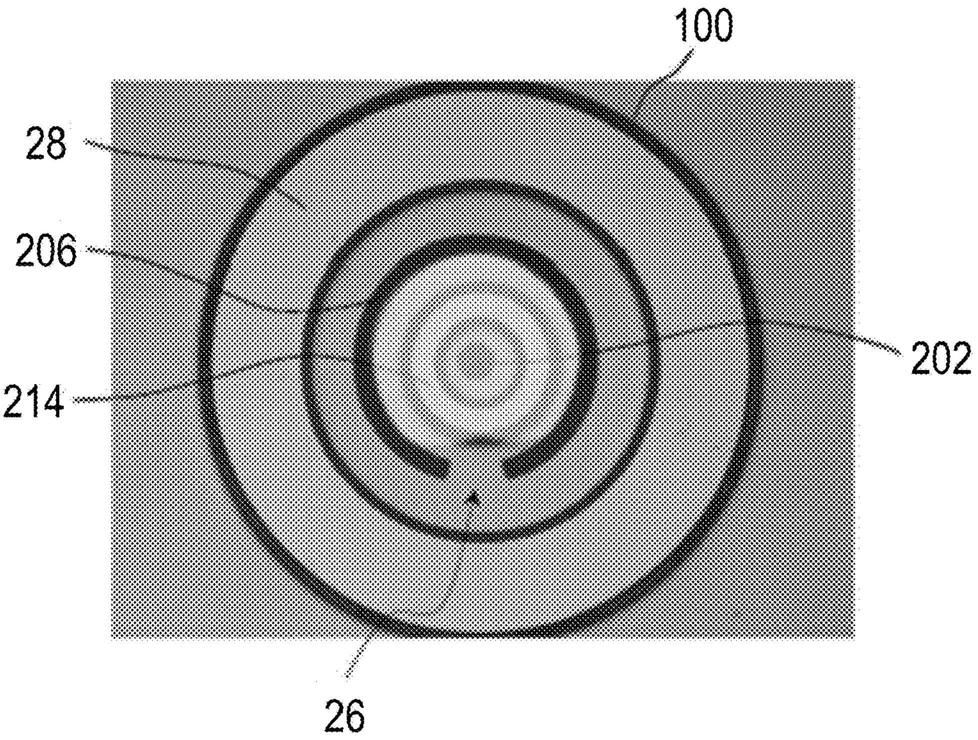
FIG. 7 is a photograph of the processing surface of an actual MFP head, with a design similar to that of FIG. 2H, according to embodiments of the present disclosure.

FIG. 7 is a photograph, taken with an inverted microscope through a glass slide, of the processing surface of an actual MFP head, whose design is similar to that of FIG. 2H. FIG. 7 shows the maintenance of a HFC zone of injected liquid between the lighter area between the inner ring and the central aperture denotes a HFC of liquid. Particularly, the photograph shows a (whitish) liquid flow (food colorant) that is hydrodynamically confined between the injection aperture 202 and the partly surrounding aspiration aperture 206. A mechanical barrier 214 is positioned between the injection aperture 202 and the partly surrounding aspiration aperture 206. Further, a supporting post 28 is concentric and surrounds the processing surface 26 of the MFP head 100.

In embodiments, the processing liquid is a heterogeneous suspension comprising cells. The processing liquid is injected so as to deposit cells of this heterogeneous suspension onto the sample surface S. The MFP head can either be kept static with respect to the sample surface S while depositing the cells, to obtain a local, homogeneous cell deposition, deposited as a spot onto the sample surface S. In variants, the MFP head can be scanned across the sample surface S, e.g., to obtain a pattern of deposited cells, as illustrated in FIG. 8.

Figure 8:
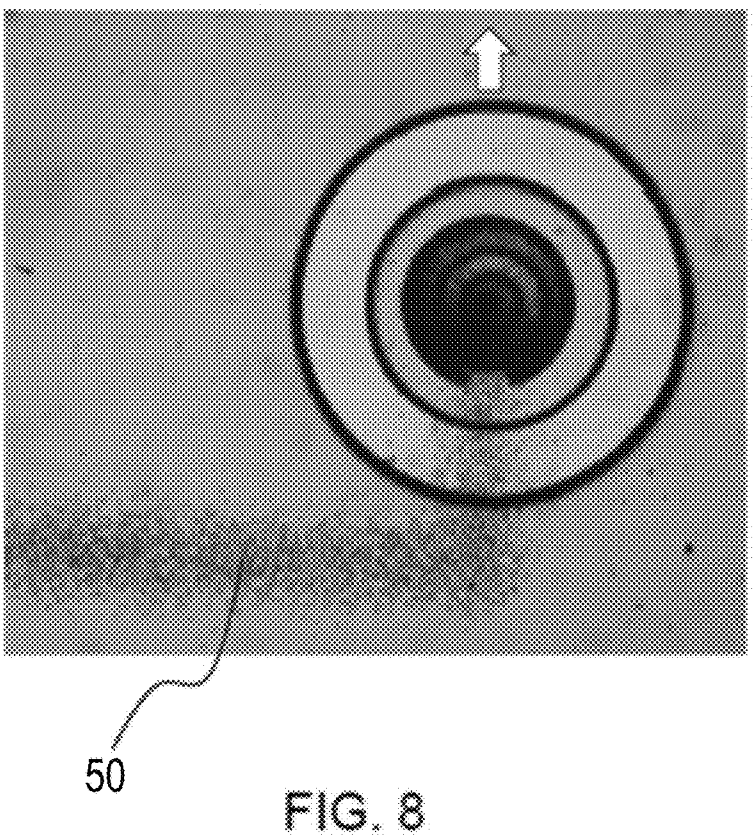
FIG. 8 is another photograph, illustrating how the MFP head of FIG. 7 can be scanned across a surface to deposit cells, according to embodiments of the present disclosure.

FIG. 8 is another photograph, illustrating how the MFP head of FIG. 7 can be scanned across a surface to deposit cells. As seen in FIG. 8, the partial extension of the aspiration aperture 206 slit around the injection aperture 202 gives rise to a gap in the aspiration aperture 206 slit; this mesa can be referred to as a circular apex arrangement. Thus, the MFP head 100 can be scanned in a direction opposite to the gap (in other words, with the gap located on the trailing edge of the direction of movement), so as to minimize perturbations to the pattern of deposited cells. As seen in FIG. 8, the MFP head 100 is first scanned from left to right and then from bottom to top and red blood cells (as processing liquid 50) are deposited onto the substrate during the scanning. The deposition of cells can be performed over large distances (e.g., a height between the MFP head and the underlying deposition surface of 190 μm) and with a scanning velocity of, for example, about 50 μm per minute. The device as shown in FIGS. 7 and 8 includes a supporting post 28 as a ring-shaped protruding structure of about 30 μm high (relative to the processing surface 26).

Figure 9:
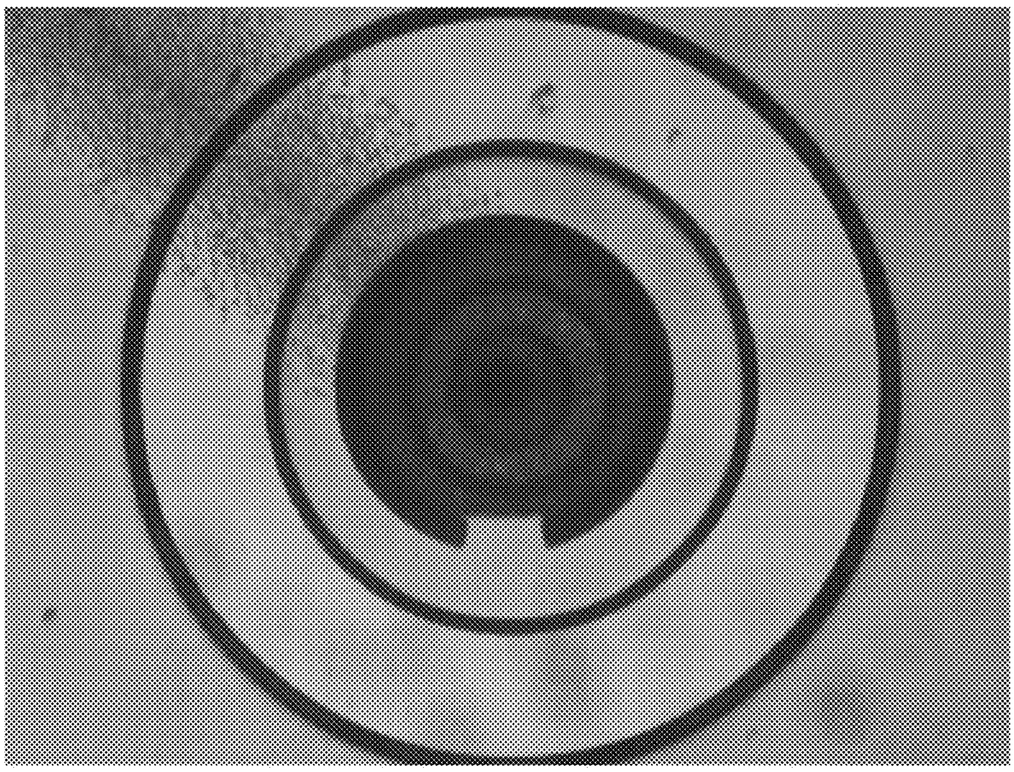
FIG. 9 is further photograph, illustrating how the MFP head of FIG. 7 can be scanned across a surface to deposit cells, according to embodiments of the present disclosure.

FIG. 9 is another photograph, also illustrating how the MFP head of FIG. 7 can be scanned across a surface to deposit cells. In the example seen in FIG. 9, the MFP head has a gap height between the underlying polystyrene surface and the circular apex mesa of 50 μm (with the same 30 μm ring-shaped protruding structure). Shown as moving in a diagonal direction at 50 μm per minute, the residence time at the rate of scanning velocity is sufficient to result in at least 50% of RBC in the injected fluid to bind with binding antibodies on the deposition surface. The homogeneous pattern of the deposition and the stability of the bound RBC, combined with the ability to move the MFP head in any direction along the plane of the deposition surface, provides for the rapid and specific deposition of RBC.

Figure 10:
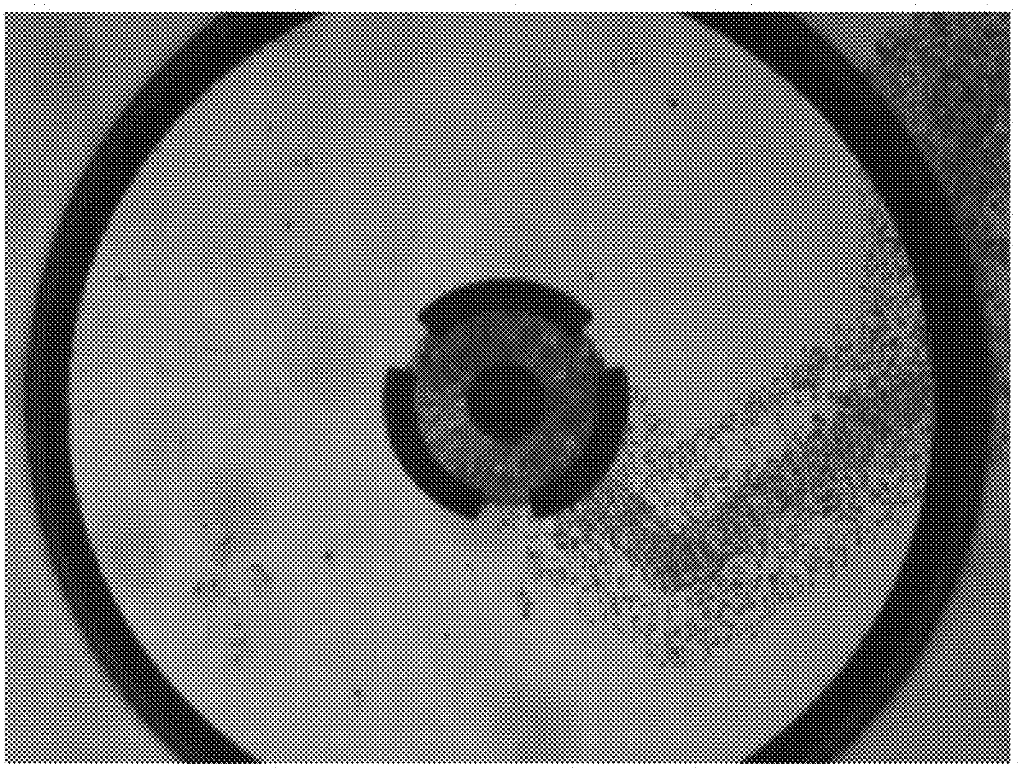
FIG. 10 is a photograph of the processing surface of an actual MFP head, with a design similar to that of FIG. 2A, according to embodiments of the present disclosure.

FIG. 10 is a photograph of the processing surface of an actual MFP head, whose design is similar to that of FIG. 2A. In the example seen in FIG. 10, the MFP head has a gap height between the underlying polystyrene surface and the circular apex mesa of 20 μm. Shown as moving in two directions at 50 μm per minute, making a turn in the deposition path, the residence time at the rate of scanning velocity is sufficient to result in at least 50% of RBC in the injected fluid to bind with binding antibodies on the deposition surface. With this MFP head, RBC are bound with most of the cells attaching in the center of the deposition path, corresponding to the position of the injection aperture. Again, the homogeneous pattern of the deposition and the stability of the bound RBC, combined with the ability to move the MFP head in any direction along the plane of the deposition surface, provides for the rapid and specific deposition of RBC.

MFP Head Testing for Sequential Chemistry Application

FIGS. 11-14 below are a series of photographs that illustrate an exemplary sequential chemistry process achieved with MFP heads as considered herein.

Figure 11:
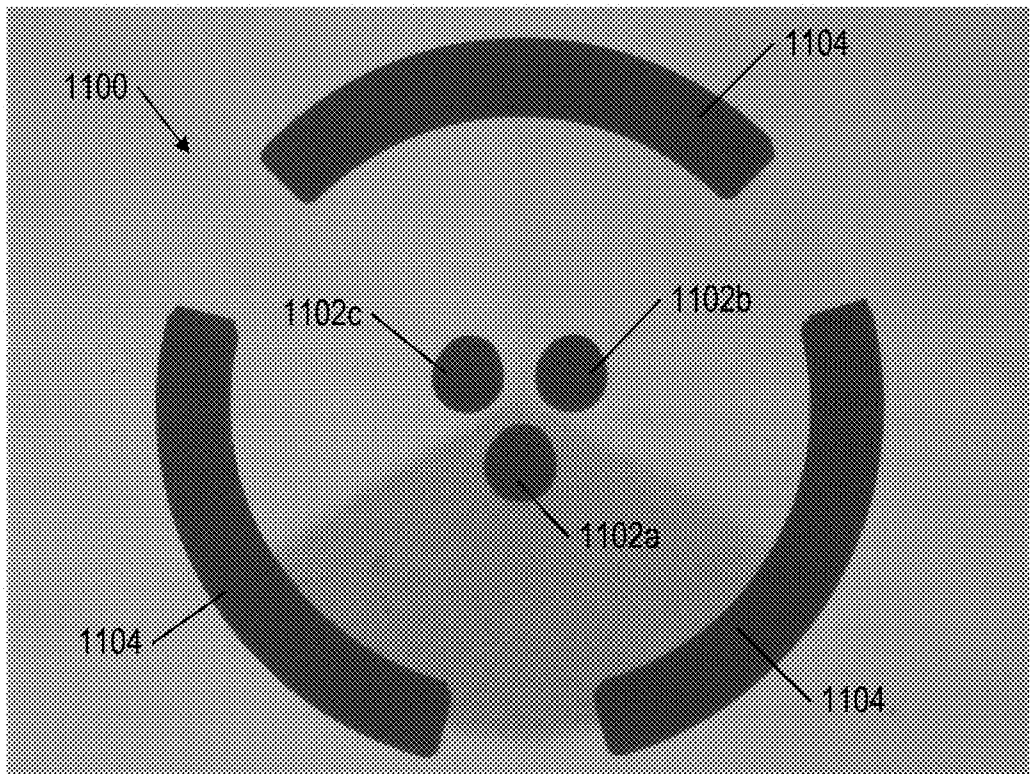
FIGS. 11-14 are a series of photographs that illustrate an exemplary sequential chemistry process, according to embodiments of the present disclosure.

FIG. 11 is a photograph showing an MFP head 1100 with three injection apertures configured to deposit RBCs (via first injection aperture 1102*a*), anti-D antibodies (via second injection aperture 1102*b*), and anti-Kell antibodies (via third injection aperture 1102*c*). Three aspiration apertures 1104 are arranged symmetrically around the center-point of the MFP head 1100. In the exemplary protocol, the distance between the mesa of the MFP head 1100 and the underlying polystyrene slide is 50 μm or 60 μm, RBCs are injected through first injection aperture 1102*a* at a rate of 2.6 μL/min, anti-D antibodies are injected through second injection aperture 1102*b* at a rate of 6.0 μL/min, and anti-Kell antibodies are injected through third injection aperture 1102*c* at a rate of 6.0 μL/min. The deposition of each reagent, sample, or target can be sequentially run through these injection apertures. The aspiration apertures 1104 draw up fluid at a rate of 29 μL/min, thereby setting and controlling the HFC for the deposition area.

Figure 12:
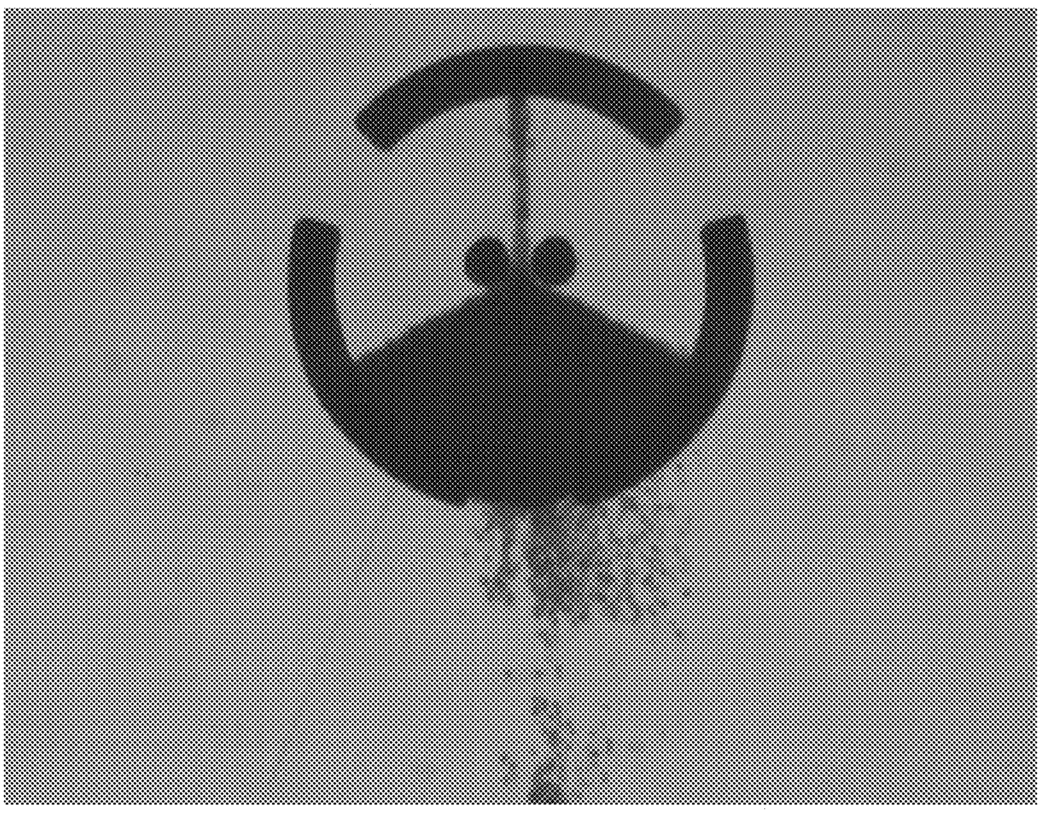

FIG. 12 is a photograph of the MFP head 1100 (set at a 50 μm gap height) moving at a scanning velocity rate of 0.05 mm/sec over a deposition surface, depositing RBCs via first injection aperture 1102*a*. It can be appreciated that the RBCs generally remain within the target region of deposition, and have a centered area of deposition on the underlying slide.

Figure 13:
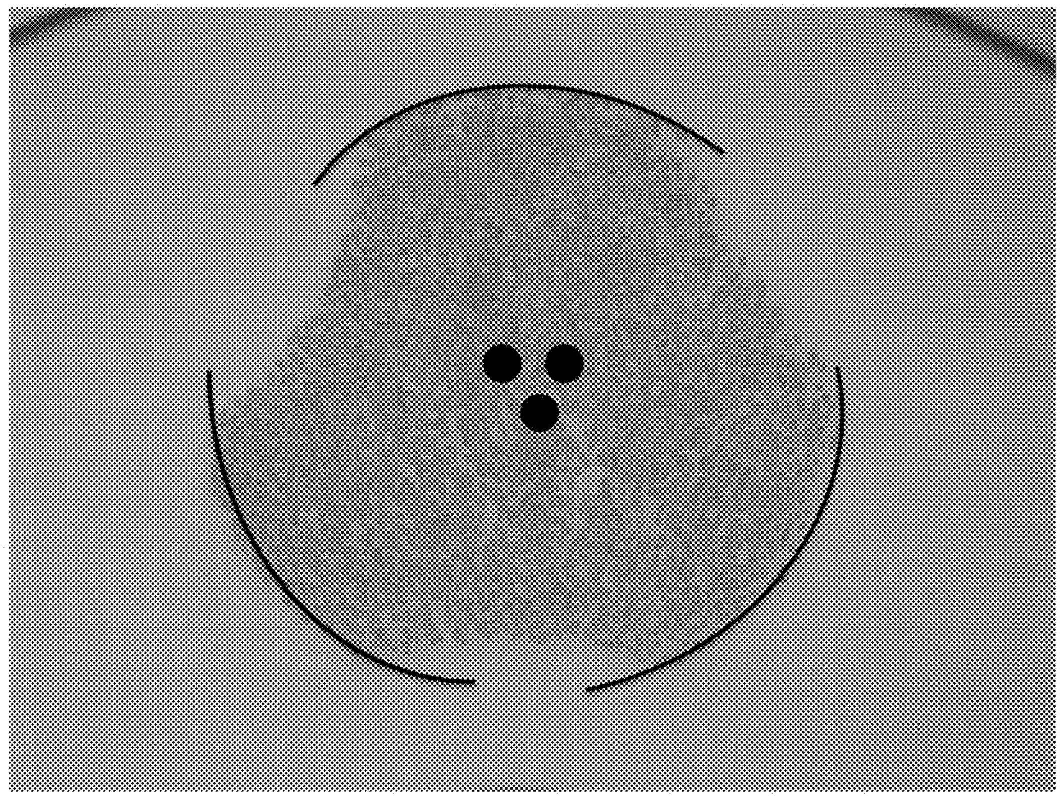

FIG. 13 is a photograph showing RBC deposition following anti-D antibody deposition on the underlying slide, with an overlay of the injection and aspiration apertures shown for reference. Deposited on a polystyrene slide from a 50 μm gap height, injection of the RBCs had a ten second (10 sec.) incubation time over the target area, followed by injection of the anti-D antibody with a sixty second (60 sec.) incubation time over the target area. It can be appreciated that specific binding of RBCs was achieved, within the desired flow confinement region as defined by the injection aspirators.

Figure 14:
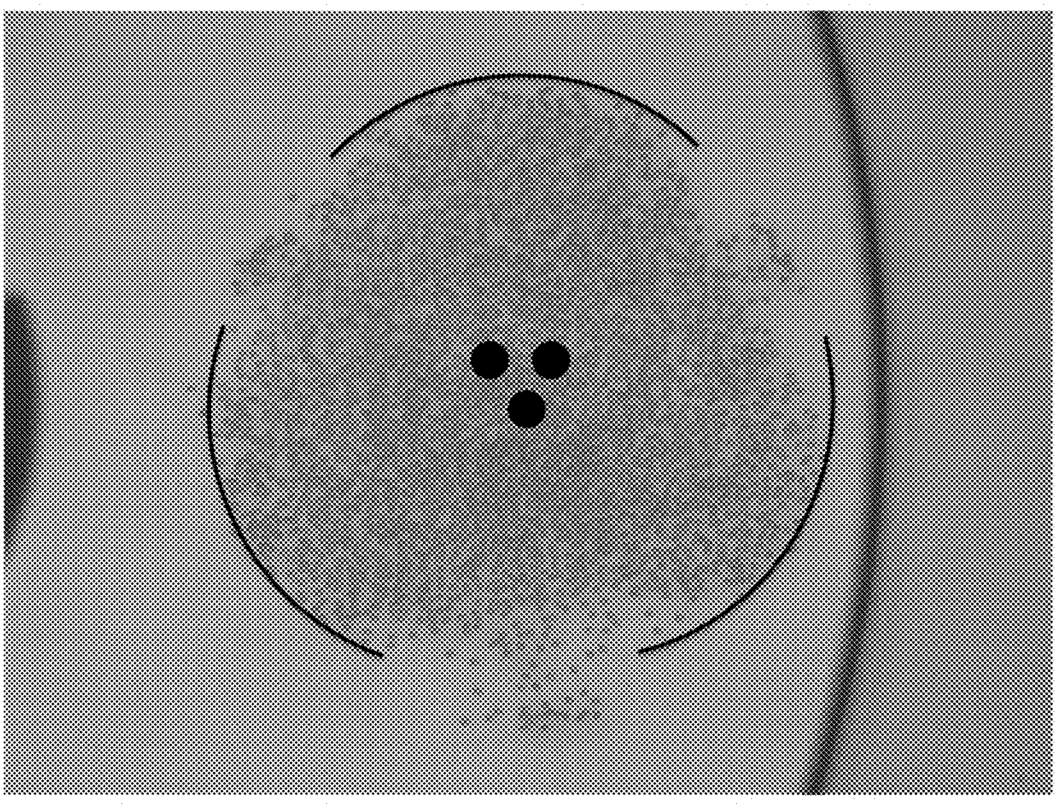

FIG. 14 is a photograph showing RBC deposition following anti-Kell antibody deposition on the underlying slide, with an overlay of the injection and aspiration apertures shown for reference. Deposited on a polystyrene slide from a 60 μm gap height, injection of the RBCs had a ten second (10 sec.) incubation time over the target area, followed by injection of the anti-Kell antibody with a sixty second (60 sec.) incubation time over the target area. Again, it can be appreciated that specific binding of RBCs was achieved, within the desired flow confinement region as defined by the injection aspirators.

In other embodiments, of the microfluidic probes considered herein, the dynamics of the processing surface and HFC can be controlled by a variety of means, including, but not limited to, increasing or decreasing the electrical resistivity of the probe head, changing the textures of the materials forming the probe, or changing the pressures of fluid flow.

While the present disclosure has been described with reference to a limited number of embodiments, variants and the accompanying drawings, it will be understood by those skilled in the art that various changes may be made and equivalents may be substituted without departing from the scope of the present disclosure. In particular, a feature (device-like or method-like) recited in a given embodiment, variant or shown in a drawing may be combined with or replace another feature in another embodiment, variant or drawing, without departing from the scope of the present disclosure. Various combinations of the features described in respect of any of the above embodiments or variants may accordingly be contemplated, that remain within the scope of the appended claims. In addition, many minor modifications may be made to adapt a particular situation or material to the teachings of the present disclosure without departing from its scope. Therefore, it is intended that the present disclosure not be limited to the particular embodiments disclosed, but that the present disclosure will include all embodiments falling within the scope of the appended claims. In addition, many other variants than explicitly touched above can be contemplated. For example, other materials than silicon or glass can be contemplated for layers, such as, e.g., PDMS or other elastomers, hard plastics (e.g., PMMA, COC, PEEK, PTFE, etc.), ceramics, or stainless steel.

It can be further appreciated that the microfluidic probe heads considered and disclosed herein can have application in areas beyond chemistry and microbiology. For example, ink jet printer heads can be formed having injection-aspirator mesa arrangements as shown herein. Alternatively, three-dimensional (3D) printing apparatuses can have such injection-aspirator mesa arrangements that can, for example, control resin deposition within a desired flow containment area.

It is appreciated that instrumentation and systems employing the MFP heads disclosed herein can include a microprocessor, and can further be a component of a processing device that controls operation of the testing procedures and sample analysis. The processing device can be communicatively coupled to a non-volatile memory device which may include any type of memory device that retains stored information when powered off. Non-limiting examples of the memory device include electrically erasable programmable read-only memory ("ROM"), flash memory, or any other type of non-volatile memory. In some aspects, at least some of the memory device can include a non-transitory medium or memory device from which the processing device can read instructions. A non-transitory computer-readable medium can include electronic, optical, magnetic, or other storage devices capable of providing the processing device with computer-readable instructions or other program code. Non-limiting examples of a non-transitory computer-readable medium include (but are not limited to) magnetic disk(s), memory chip(s), ROM, random-access memory ("RAM"), an ASIC, a configured processor, optical storage, and/or any other medium from which a computer processor can read instructions. The instructions may include processor-specific instructions generated by a compiler and/or an interpreter from code written in any suitable computer-programming language, including, for example, C, C++, C#, Java, Python, Perl, JavaScript, etc.

The above description is illustrative and is not restrictive, and as it will become apparent to those skilled in the art upon review of the disclosure, that the present disclosure may be embodied in other specific forms without departing from the essential characteristics thereof. For example, any of the aspects described above may be combined into one or several different configurations, each having a subset of aspects. Further, throughout the foregoing description, for the purposes of explanation, numerous specific details were set forth in order to provide a thorough understanding of the disclosure. It will be apparent, however, to persons skilled in the art that these embodiments may be practiced without some of these specific details. These other embodiments are intended to be included within the spirit and scope of the present disclosure. Accordingly, the scope of the disclosure should, therefore, be determined not with reference to the above description, but instead should be determined with reference to the following and pending claims along with their full scope of legal equivalents.

What is claimed is:

1. A microfluidic probe head, comprising:

a processing surface, configured to interact with fluids along the processing surface;

one or more injection apertures in the processing surface;

one or more aspiration apertures in the processing surface, with the one or more aspiration apertures having elongated shape extending around the one or more injection apertures, wherein the elongated shape of the one or more aspiration apertures extend around 55-95% of a perimeter of at least one of the one or more injection apertures, and the one or more aspiration apertures with the elongated shape do not fully connect around the perimeter of the one or more injection apertures; and one or more barriers extending from the processing surface, and positioned between the one or more injection apertures and the one or more aspiration apertures, wherein the one or more barriers intercepts a fluid flow path between the one or more injection apertures and the one or more aspiration apertures.

2. The microfluidic probe head of claim 1, wherein at least one of the one or more barriers include a stepped barrier structure positioned between the one or more injection apertures and the one or more aspiration apertures.

3. The microfluidic probe head of claim 1, wherein the one or more injection apertures are primary injection apertures, further comprising one or more secondary injection apertures, positioned to dispense a secondary fluid to direct a flow of fluids dispensed from the one or more primary injection apertures.

4. The microfluidic probe head of claim 1, further comprising one or more post structures, positioned distal from the one or more injection apertures, and extending from the processing surface a length equal to a working distance.

5. The microfluidic probe head of claim 1, wherein: each injection aperture is circular, wherein an average diameter of each injection aperture is between 25 μm and 150 μm, wherein each aspiration aperture comprises an elongate slit, and wherein an average width of each aspiration aperture is between 25 μm and 200 μm.

6. The microfluidic probe head of claim 1, further comprising: two or more liquid aspiration apertures on the processing surface, and the two or more liquid aspiration apertures comprise two or more curved slits, each shaped so as to extend partly around the one or more injection apertures on the processing surface.

7. The microfluidic probe head of claim 6, wherein the two or more liquid aspiration apertures comprises n curved slits that have, on the processing surface, rotational symmetry of order n, $n \geq 2$.

8. The microfluidic probe head of claim 6, wherein each of the two or more curved slits extends partly along a same circle on the processing surface.

9. The microfluidic probe head of claim 8, wherein a cumulated length of the two or more curved slits along said same circle amounts to 55% to 95% of a perimeter of said same circle.

10. The microfluidic probe head of claim 1, wherein the microfluidic head comprises at least two layers, a capping layer and a liquid routing layer, wherein a bottom face of the capping layer covers a top face of the liquid routing layer, wherein the processing surface is defined by a bottom face of the liquid routing layer, opposite to the top face thereof, wherein the liquid routing layer comprises:

a liquid injection aperture and a liquid aspiration aperture, each defined on the bottom face of the liquid routing layer;

at least one liquid injection channel in fluid communication with said liquid injection aperture through at least one microchannel extending as a through-hole through a thickness of the liquid routing layer; and at least one liquid aspiration channel in fluid communication with said liquid aspiration aperture through at least one microchannel extending as through-hole through a thickness of the liquid routing layer.

11. The microfluidic probe head of claim 10, further comprising one or more additional apertures arranged on the processing surface and shaped so as to extend partly around said liquid aspiration aperture on the processing surface.

12. The microfluidic probe head of claim 1, wherein one of the one or more barriers comprises a flat surface protruding from the processing surface, and shaped so as to extend around the one or more injection apertures.

13. The microfluidic probe head of claim 12, wherein one of the one or more barriers comprises a circular protrusion, wherein an average diameter of the circular protrusion is between 340 and 2200 μm, and an average width of the circular protrusion is between 100 and 650 μm.

14. The microfluidic probe head of claim 12, wherein a circular protrusion is a first protruding structure, which protrudes from the processing surface between the one or more injection apertures and the one or more aspiration apertures, and the processing surface further comprises a second protruding structure, having a flat surface protruding from the processing surface, and shaped so as to extend around the one or more aspiration apertures.

15. The microfluidic probe head of claim 1, wherein the one or more aspiration apertures comprises a slit, the processing surface comprises two or more liquid injection apertures aligned on said processing surface and the slit of the one or more aspiration apertures has a wavy shape, so as to extend partly around each of the two or more liquid injection apertures on the processing surface.

16. A microfluidic probe device comprising the microfluidic probe head of claim 1, the microfluidic probe device being further configured to inject liquid via the one or more injection apertures and aspirate liquid from the one or more aspiration apertures.

17. A method of operating the microfluidic probe head according to claim 1, wherein the one or more injection apertures is a liquid injection aperture, and the one or more aspiration apertures is a liquid aspiration aperture, the method comprising:

positioning the microfluidic probe head in proximity with a sample surface to be processed, such that the processing surface faces the sample surface; and injecting processing liquid via the liquid injection aperture while aspirating liquid from the liquid aspiration aperture, to process the sample surface.

18. The method according to claim 17, wherein the processing liquid is a heterogeneous suspension comprising cells, and wherein injecting processing liquid is performed so as to deposit cells of this heterogeneous suspension onto the sample surface.

19. The method according to claim 17, wherein the microfluidic probe head further comprises one or more additional apertures arranged on the processing surface and shaped so as to extend partly around said liquid aspiration aperture on the processing surface; wherein the microfluidic probe head is positioned at a working distance in relation to the sample surface, wherein the sample surface is immersed in an immersion liquid and the microfluidic probe head is at least partly immersed in the immersion liquid, and wherein the method further comprises aspirating or injecting liquid from the one or more additional apertures, while aspirating liquid from said liquid aspiration aperture.

20. The method according to claim 17, wherein the steps of injecting the processing liquid and aspirating liquid are performed so as to maintain a hydrodynamic flow confinement of injected liquid between the liquid injection aperture and the liquid aspiration aperture.

* * * * *